United States Patent
Ohtake

(10) Patent No.: US 6,339,509 B1
(45) Date of Patent: Jan. 15, 2002

(54) VARIABLE FOCAL LENGTH OPTICAL SYSTEM

(75) Inventor: Motoyuki Ohtake, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/499,642

(22) Filed: Feb. 8, 2000

(30) Foreign Application Priority Data

Feb. 10, 1999 (JP) .......................................... 11-032900
Jan. 7, 2000 (JP) ...................................... 2000-001968

(51) Int. Cl.[7] .............................................. G02B 15/14
(52) U.S. Cl. ...................... 359/689; 359/714; 359/716; 359/740; 359/764; 359/791
(58) Field of Search ................................ 359/676, 689, 359/714, 716, 739, 740, 764, 791

(56) References Cited

U.S. PATENT DOCUMENTS 5,327,290 A  7/1994  Fukushima et al. ......... 359/692
5,424,870 A  6/1995  Hashimura et al. ......... 359/689

*Primary Examiner*—Evelyn A Lester
(74) *Attorney, Agent, or Firm*—Miles & Stockbridge P.C.

(57) ABSTRACT

A variable focal length optical system of reducing size and increased zoom ratio is provided. According to one aspect. at least three lens groups, in order from an object side, a first lens group G1 having a positive refractive power, a second lens group G2 having a positive refractive power, and a third lens group G3 having a negative refractive power. When a state of lens group positions is changed from a wide-angle end state to a telephoto end state, each lens group moves to the object side such that an air gap between the first lens group G1 and the second lens group G2 increases, and an air gap between the second lens group G2 and the third lens group G3 decreases. An aperture diaphragm is arranged between the first lens group G1 and the third lens group G3. The second lens group G2 is arranged in the vicinity of the aperture diaphragm and has a positive lens having double aspherical surfaces. Particular conditions are satisfied.

12 Claims, 17 Drawing Sheets

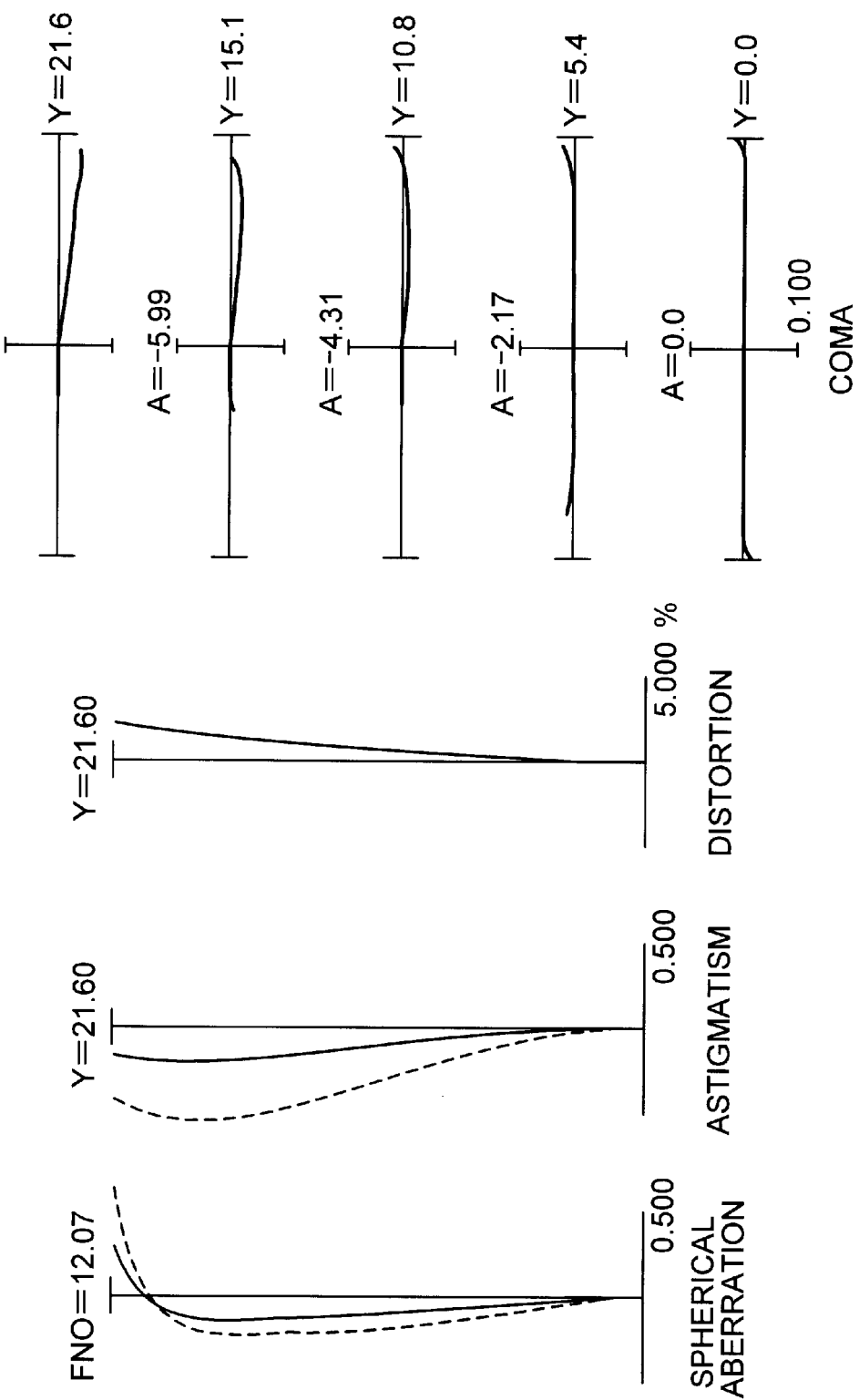

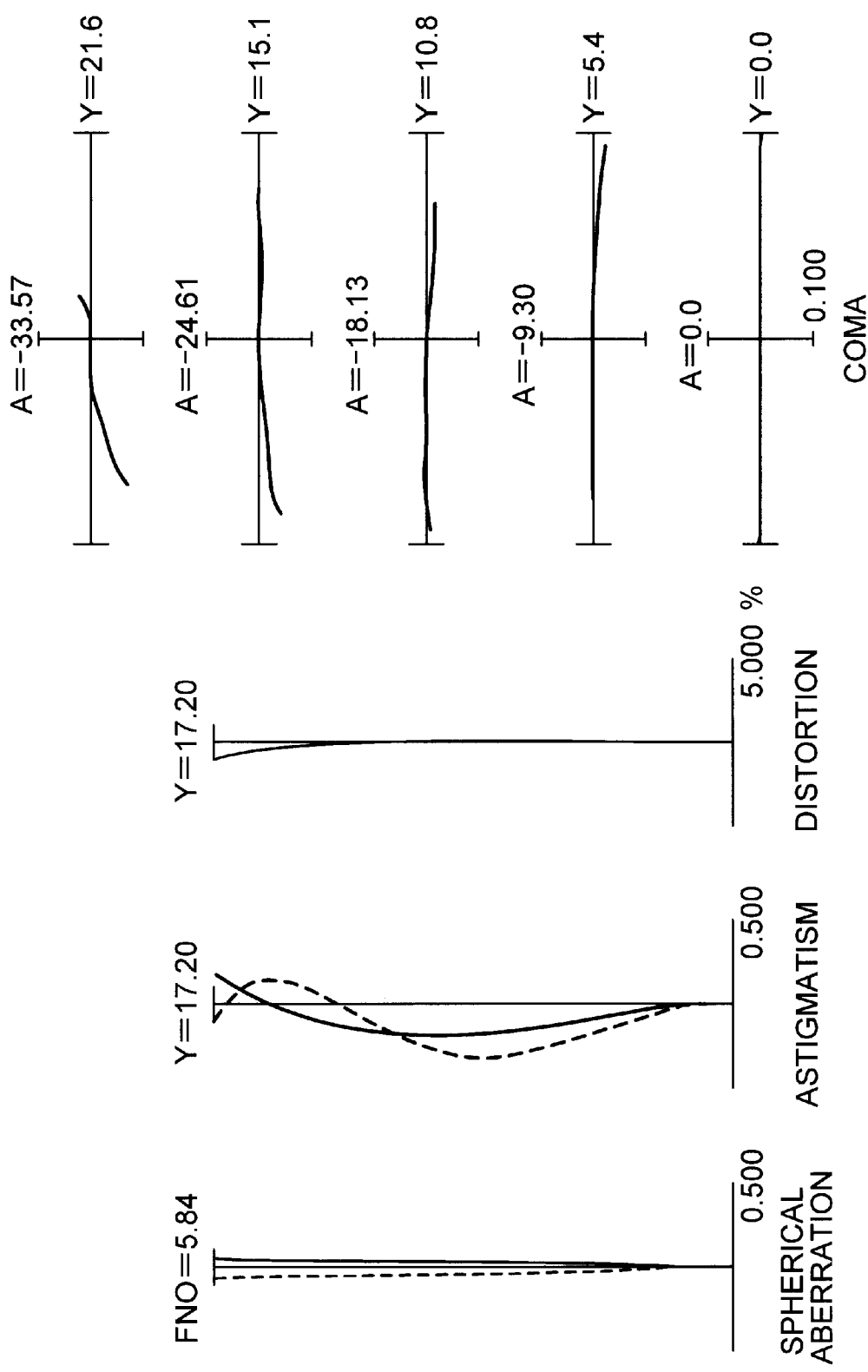

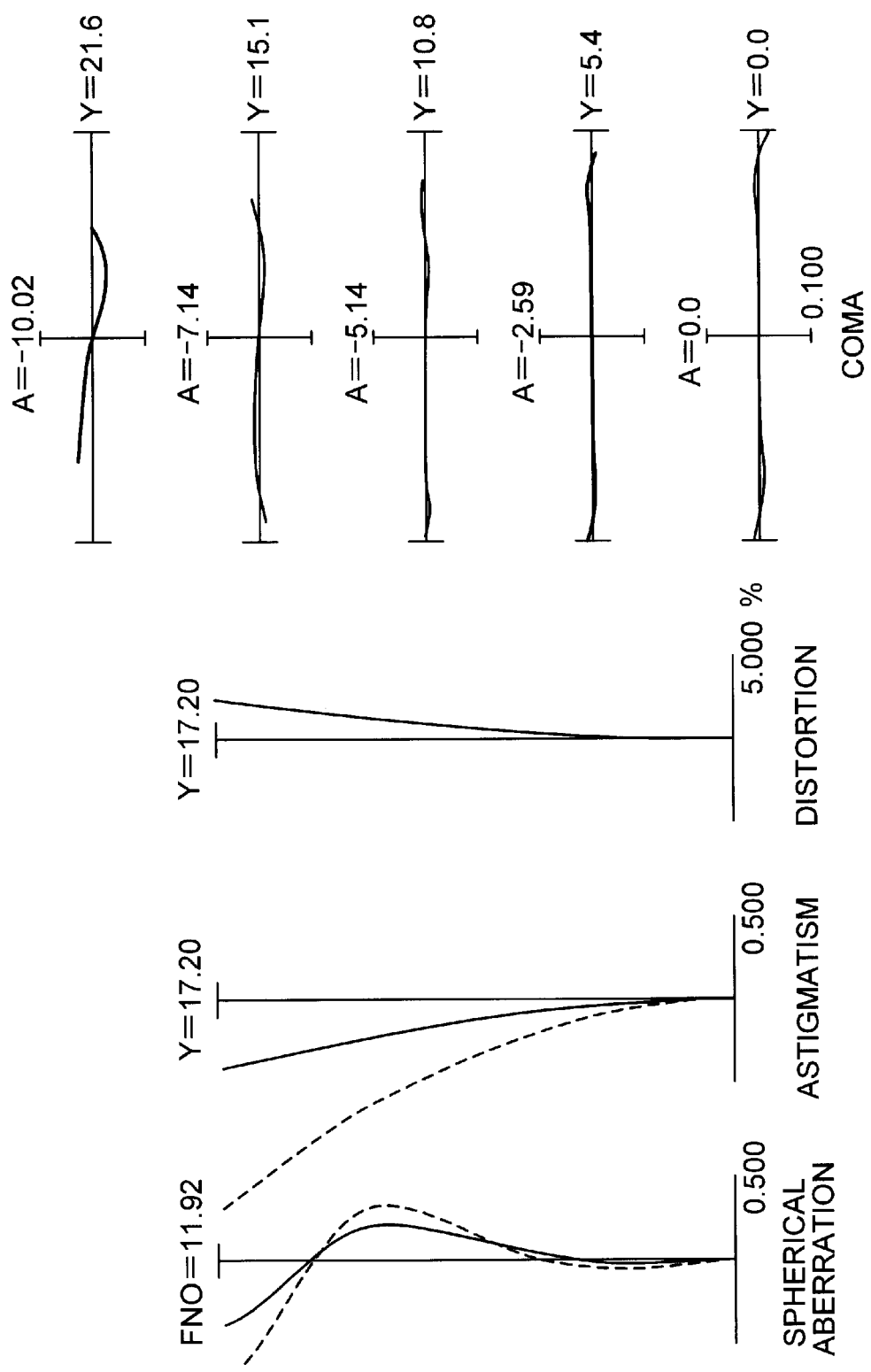

VARIABLE FOCAL LENGTH OPTICAL SYSTEM

This application claims the benefit of Japanese Patent applications Nos. 11-32900 and 2000-1968 which are hereby Incorporated by reference.

BACKGROUND OF THE INVENTION

1. Field of the Invention

The present invention relates to a variable focal length optical system and, in particular, relates to a variable focal length optical system suitable for use as a high zoom ratio lens.

2. Related Background Art

Since portability has recently been regarded as important for a lens shutter type camera, a small-sized lightweight picture-taking lens is proposed. It has recently become common to use a zoom lens in a picture-taking lens used for a lens shutter type camera. A zoom lens has a merit for a photographer to make it possible to take picture at will in accordance with variation of focal length. On the other hand, it also has a demerit to make it difficult to make a camera body being compact since total length of a lens system varies drastically according to variation of its focal length. In order to reduce size and weight of a camera body, it is inevitable to reduce size of a picture-taking lens and, therefore, it is important to reduce total length and diameter of a picture-taking lens.

In order to reduce the total lens length, it is suitable to strengthen the power of each lens group consisting of the optical system. However, since the refractive power of each lens surface becomes strong, the optical quality of the optical system will be degraded. In order to reduce diameter of an optical system, it is suitable to reduce the number of lens use in the optical system. Since, in this case also, the refractive power of each lens surface becomes strong, the optical quality of the optical system will be degraded.

Further, since production technology of aspherical lens is significantly improved lately, it has become common to accomplish compactness by positively putting aspherical lens into picture-taking lens. When the aspherical lens is arranged in the vicinity of the aperture diaphragm, it will be served as correcting spherical aberration. When an aspherical lens is arranged away from an aperture diaphragm, it will be served as correcting off-axis aberration. The degradation of the optical quality caused by getting stronger the refractive power of each lens surface is reduced by aberration correction function of an aspherical surface. Therefore, it is accomplished that the picture-taking lens is made to be small-sized.

An aspherical lens is classified roughly into a single side aspherical lens and a double aspherical lens. Although single side aspherical lens is common, it is proposed that both sides aspherical lens is introduced in a variable focal length optical system, such as Japanese Laid-Open Patent Application Nos. 3-127012 and 4-78811.

In the case developing a zoom lens for a lens shutter type camera having a high zoom ratio and high optical quality maintaining compactness, if further high specification or further compactness is required, it is necessary to further reduce the number of lens or to make the refractive power of each lens surface stronger. Therefore, it is necessary to make use of more aspherical lenses. Since aspherical lenses are mainly made by molding process suitable for mass production, the response in high spatial frequency is not linear enough, because of a minute undulatory element remained on the surface of metal mold for molding In other words, there is a problem that the output deforms with respect to input. Therefore, compactness cannot always be effectively accomplished by simply increasing the number of aspherical lens. Accordingly, it becomes important to effectively make use of smaller number of aspherical lenses.

In variable focal length optical systems disclosed in Japanese Laid-Open Patent Application Nos. 3-127012 and 4-78811, the aberration correction function of each aspherical surface is not clearly allocated. Further, it is problem that the effect of compactness and high quality resulted from introduction of aspherical lens is not sufficient. Since a lot of aspherical lenses are used in those lens systems, decentering or the like introduced in the manufacturing process degrades optical quality. Therefore, there is another problem that the product (optical system) with stable optical quality cannot be provided to customer.

SUMMARY OF THE INVENTION

The present invention is made in view of the aforementioned problems and has an object to provide a variable focal length optical system suitable for reducing the size and increasing the zoom ratio of the system.

According to one aspect of the present invention, a variable focal length optical system includes at least three lens groups, in order from object side, a first lens group G1 having a positive refractive power, a second lens group G2 having a positive refractive power, and a third lens group G3 having a negative refractive power. When a state of lens group positions is changed from a wide-angle end state to a telephoto end state, each lens group moves to the object side such a manner that an air gap between said first lens group G1 and said second lens group G2 increases, and an air gap between said second lens group G2 and said third lens group G3 decreases. An aperture diaphragm is arranged between said first lens group G1 and said third lens group G3. Said second lens group G2 is arranged in the vicinity of said aperture diaphragm and has a positive lens having double aspherical surfaces. The following conditional formulae are satisfied:

$$Da/f < 0.08 \tag{1}$$

$$0.3 < (Ra+Rb)/(Ra-Rb) < 0.95 \tag{2}$$

where Da denotes an air gap along to an optical axis between said aperture diaphragm and said positive lens, f denotes a focal length of said variable focal length optical system, Ra denotes a radius of curvature of a surface of said positive lens facing to a space where said aperture diaphragm exists, and Rb denotes a radius of curvature of a surface of said positive lens facing to a space opposite to said space where said aperture diaphragm exists (where Rb<0).

BRIEF DESCRIPTION OF THE DRAWINGS

FIGS. 5A to 5D show various aberrations of a variable focal length optical system according to Numerical Example 1 of the present invention focused on infinite object in the telephoto end state.

FIGS. 13A to 13D show various aberrations of a variable focal length optical system according to Numerical Example 3 of the present invention focused on infinite object in the wide-angle end state.

FIGS. 15A to 15D show various aberrations of a variable focal length optical system according to Numerical Example 3 of the present invention focused on infinite object in the telephoto end state.

DESCRIPTION OF THE PREFERRED EMBODIMENTS

Figure 1A:
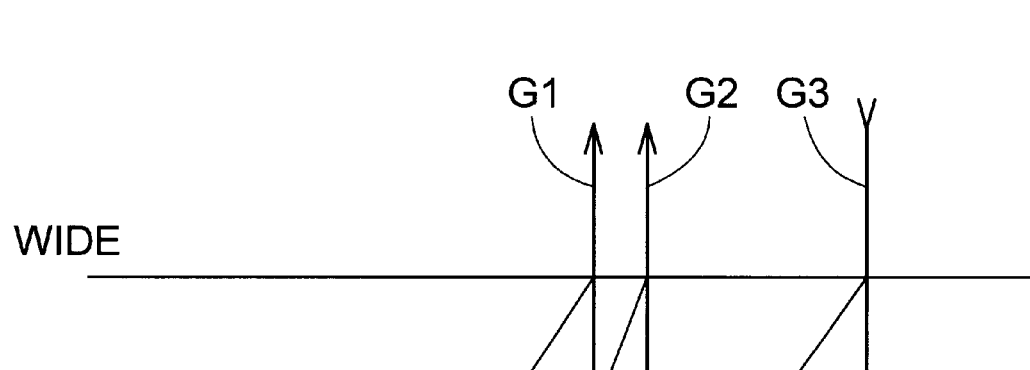
FIGS. 1A and 1B are diagrams showing distribution of refractive power of a variable focal length optical system according to Numerical Example 1 of the present invention.

In the present invention, a positional relation between the aperture diaphragm and the double aspherical lens is important. Since off-axis rays are generally incident to the optical system with a certain angle relative to the optical axis, off-axis rays passing through a lens arranged in the vicinity of the aperture diaphragm pass near to the optical axis. On the other hand, off-axis rays passing through a lens arranged away from the aperture diaphragm pass away from the optical axis.

In the present invention, a lens with a certain thickness having double aspherical surfaces is arranged in the vicinity of the aperture diaphragm. A surface facing to a space (near side to the aperture diaphragm) where the aperture diaphragm exists (hereinafter referred to as "first aspherical surface") has a function of correcting mainly spherical aberration. The other surface facing to a space (far side to the aperture diaphragm) opposite to the space where the aperture diaphragm exists (hereinafter referred to as "second aspherical surface") has a function of correcting mainly off-axis aberrations. By allocating the aberration correction functions to two lens surfaces, both high zoom ratio and high optical quality can be achieved with smaller number of lenses.

In optical systems having same angle of view, since refractive power arrangement before and behind the aperture diaphragm changes in accordance with the sign of the refractive power of a lens arranged in the vicinity of the aperture diaphragm, an angle of a principal ray passing through the aperture diaphragm relative to the optical axis changes. This angle is smaller in negative lens than in positive lens. Therefore, when the double aspherical lens has a negative refractive power, since off-axis rays passing through a lens surface remote from the aperture diaphragm passes near the optical axis, aberration correction functions cannot be allocated enough. In the present invention, by means of constructing the double aspherical lens with a positive refractive power, aberration correction functions can be allocated enough and aberration correction effect is successfully obtained.

Since each surface of the aspherical lens has a different aberration correction function, the picture-taking lens can be smaller than a picture-taking lens with a lens having an aspherical surface.

In order to fully bring out effect of a double aspherical lens according to the present invention, it is desirable to construct optical system as described bellow.

When the first aspherical surface has strong convex surface facing to the aperture diaphragm, since rays are strongly converged and off-axis rays passing through the second aspherical surface passes away from the optical axis, allocation of aberration correction functions is not enough. Therefore, this is undesirable. Accordingly, it is desirable that the refractive power of the surface near the aperture diaphragm is to be weak.

Further, it is important to properly arrange an air gap between the aperture diaphragm and the double aspherical lens. When the air gap becomes wide(large), aberration correction function cannot be allocated enough. When the state of the lens group position is changed from the wide-angle end state to the telephoto end state, variation of off-axis aberration according to the change in the state of the lens group position can be corrected well by changing the air gap between the aperture diaphragm and the double aspherical lens. If the double aspherical lens is too remote from the aperture diaphragm in the wide-angle end state or in the telephoto end state, aberration correction function cannot be allocated enough as described above. Therefore, it is desirable to properly arrange the air gap with respect to the focal length.

A picture-taking optical system suitable for introduction of above-mentioned double aspherical lens will be described. It has been well known that there is a certain type of zoom lens (variable focal length optical system) suitable for lens shutter type camera such as positive-negative two-group type zoom lens consisting of, in order from object side, a positive lens group and a negative lens group, and positive-positive-negative three-group type zoom lens consisting of, in order from object side, a first positive lens group, a second positive lens group, and a negative lens group.

In a positive-negative two-group type zoom lens, since variable-focal-length lens group is only a negative lens group, it is difficult to obtain high zoom ratio. Accordingly, it is desirable that a variable focal length optical system according to the present invention is applied to a positive-positive-negative three-group type zoom lens comprising, in order from object side, a first lens group G1 having a positive refractive power, a second lens group G2 having a positive refractive power, and a third lens group G3 having a negative refractive power.

In order to preferably correct off-axis aberrations produced while zooming, it is ideal that the aperture diaphragm is arranged in the middle of the optical system. In the present invention, it is preferable to arrange the aperture diaphragm between the first lens group G1 and the third lens group G3, and, more preferably, to arrange the aperture diaphragm in the vicinity of the second lens group G2.

Further, since the aperture diaphragm is arranged in the vicinity of the second lens group G2, it is desirable to arrange above-mentioned double aspherical lens in the second lens group G2.

Furthermore, in the present invention, when a state of lens group positions is changed from a wide-angle end state to a telephoto end state, each lens group moves to the object side in such a manner that an air gap between the first lens group G1 and the second lens group G2 increases, and an air gap between the second lens group G2 and the third lens group G3 decreases. As a result, lateral magnifications of the second lens group G2 and the third lens group G3 increase. In such a manner, the optical system is constructed. Consequently, variation(change) of focal length(i.e. zooming operation) can be performed effectively and further compactness can be achieved.

Since the first lens group G1 having a convergent effect is moved to the object side in such a manner that the air gap to the second lens group G2 in the telephoto end state become wider(larger) than in the wide-angle end state, the total lens length, particularly in the telephoto end state, becomes short.

The second lens group G2 has a function of further converging rays converged by the first lens group G1. When a state of lens group positions is changed from a wide-angle end state to a telephoto end state, variation of off-axis aberrations caused by the change in the lens position is corrected by changing an air gap between the first lens group G1 and the second lens group G2.

Furthermore, the third lens group G3 has a function of enlarging an image formed by the first G1 and second G2 lens group. When a state of lens group positions is changed from a wide-angle end state to a telephoto end state, the third lens group G3 bears a variable magnification function increasing the magnification by moving to the object side.

In order to achieve an optical system having a high zooming ratio and high optical quality, it is important to arrange an aperture diaphragm at or about the center of an optical system. In the present invention, as described above, an aperture diaphragm is arranged in the vicinity of the second lens group G2. When a state of lens group positions is changed, variation of off-axis aberrations caused by the change in the lens position is corrected well by largely changing an air gap between the first lens group G1 and the second lens group G2, and an air gap between the second lens group G2 and the third lens group G3.

In the present invention, the following conditional formulae (1) and (2) are satisfied under the aforementioned lens construction:

$$Da/f<0.08 \tag{1}$$

$$0.3<(Ra+Rb)/(Ra-Rb)<0.95 \tag{2}$$

where Da denotes an air gap along the optical axis between said aperture diaphragm and said positive lens, f denotes a focal length of said variable focal length optical system, Ra denotes a radius of curvature of a first aspheric surface close to the aperture diagram in the double aspherical lens arranged at adjacent to the aperture diagram, Rb denotes a radius of curvature of a second aspheric surface opposite to (far away from) the aperture diagram in the double aspherical lens arranged at adjacent to the aperture diagram (where Rb<0)

Conditional formula (1) defines an appropriate range of the air gap along to the optical axis between the aperture diaphragm and the double aspherical lens. When the ratio Da/f exceeds the upper limit of the conditional formula (1), since the air gap between the aperture diaphragm and the double aspherical lens becomes wide, aberration correction functions of the double aspherical lens cannot be separated to each surface. As a result, the effect of the double aspherical lens cannot be fully used.

Conditional formula (2) defines an appropriate range of the shape of the double aspherical lens. When the shape factor $(Ra+Rb)/(Ra-Rb)$ falls bellow the lower limit of conditional formula (2), since off-axis rays passing through the second aspherical surface passes near to the optical axis, aberration correction function cannot be separated enough. On the other hand, when the shape factor exceeds the upper limit of conditional formula (2), since rays cannot be converged at the first aspherical surface, and converging effect of the second aspherical surface becomes extremely large, small amount of decentering causes severe degradation on the optical quality. As a result, stable optical quality cannot be guaranteed in the manufacturing process of the optical system and reasonable priced, high quality products (optical system) cannot be provided to customers. This is undesirable.

In the present invention, whenever a state of lens group positions is changed, it is desirable to always satisfy conditional formula (1).

Further, in the present invention, in order to fully separate aberration correction functions to both surfaces of the double aspherical lens, and to bring out the effect of aspherical surfaces, it is desirable to satisfy following conditional formula (3):

$$0.03<Db/fw<0.10 \tag{3}$$

where Db denotes a thickness of the double aspherical lens along to the optical axis, and fw denotes a focal length of the variable focal length optical system in the wide-angle end state.

When the ratio Db/fw falls below the lower limit of conditional formula (3), since aberration correction functions of the double aspherical lens cannot be separated enough, as described before, good optical quality cannot be obtained. Conversely, when the ratio exceeds the upper limit of conditional formula (3), since the thickness of the lens becomes too large, manufacturing time becomes long and manufacturing's cost becomes high.

In the present invention, in order to achieve high optical quality with small number of lenses, it is important to appropriately determine a focal length of the second lens group G2. It is desirable to satisfy the following conditional formula (4):

$$0.4 < f2/(fw \cdot ft)^{1/2} < 0.7 \quad (4)$$

where f2 denotes a focal length of the second lens group G2, and ft denotes a focal length of the variable focal length optical system in the telephoto end state.

Conditional formula (4) defines an appropriate range of the focal length of the second lens group G2. When the ratio $f2/(fw \cdot ft)^{1/2}$ falls below the lower limit of conditional formula (4), since refractive powers of negative sub lens group and positive sub lens group, each consisting of the second lens group G2, become strong with each other, mutual decentering produced in the manufacturing process will severely degrade optical quality. This is undesirable. Conversely, when the ratio $f2/(fw \cdot ft)^{1/2}$ exceeds the upper limit of conditional formula (4), since off-axis rays passing through the third lens group G3 in the wide-angle end state passes away from the optical axis, compactness of the optical system cannot be maintained.

Furthermore, in the present invention, it is desirable that the second lens group G2 includes, in order from object side, a negative sub lens group and a positive sub lens group, an aperture diaphragm is arranged between the negative sub lens group and the positive sub lens group, and a double aspherical lens is arranged in the positive sub lens group. By constructing the second lens group G2 with a negative sub lens group and a positive sub lens group, positive distortion likely to be produced in the wide-angle end state can be corrected well, satisfactory back focal length can be secured, and diameter of the optical system becomes small. When the back focal length in the wide-angle end state is too short, an image of dust clung on a most image side surface of the optical system tends to be recorded on a film, and it degrades image quality. On the other hand, when the back focal length is too long, variation(change) of off-axis aberration with respect to image angle cannot be corrected well. Therefore, satisfactory back focal length means the length not producing aforementioned problems.

In the present invention, it is preferable that the refractive powers of the negative sub lens group and the positive sub lens group is consisted of the second lens group G2 are made weak, and that the number of lens is reduced. Therefore, it is desirable that the negative sub lens group consisting of a cemented lens consisting of a negative lens having a concave surface facing to the object side and a positive lens having a convex surface facing to the image side, and a positive sub lens group is consisted of a double aspherical lens having double convex surfaces.

In order to increase zoom ratio of the optical system keeping high optical quality, it is important that the amount of aberration produced by each lens group should be reduced within each lens group. It is important to correct specially generation of spherical aberration satisfactory. In the present invention, it is desirable that the first G1 and third G3 lens groups, each lens group consists of two lenses, a positive lens and a negative lens, respectively.

Further, in order to reduce total lens length in the telephoto end state, the first lens group G1 consists of a cemented lens consisting of a double convex positive lens and a negative meniscus lens having a concave surface facing to the object side, and the third lens group G3 consists of a positive lens and a negative meniscus lens, arranged to the image side of said positive lens, having a concave surface facing to the object side.

In the present invention, by arranging another aspherical lens other than the double aspherical lens, further increase in the optical quality and further compactness can be obtained. When both surfaces of the positive lens arranged in the third lens group G3 are particularly made to be aspherical surfaces, variation of coma relative to angle of view in the wide-angle end state can be corrected satisfactory and variation of off-axis aberrations while zooming also can be corrected satisfactory.

In the present invention, stable optical quality can be obtained in the manufacturing process by taking following consideration on aforementioned double aspherical lens.

In aspherical surface generally, radius of curvature, in other words, refractive power changes relative to a height from the optical axis. At this time, if aberration correction function of the aspherical lens is raised, since variation of refractive power becomes large, optical quality tens to be degraded severely by decentering produced in the manufacturing process that lenses are put into lens barrel. Therefore, in double aspherical lens, degradation of optical quality tends to occur by decentering relative to each surface produced in the molding process.

In the present invention, the aperture-diaphragm-side surface of the double aspherical lens mainly corrects spherical aberration using the fact that off-axis rays on the aperture-diaphragm-side surface passes near the optical axis and that on the other side surface passes away from the optical axis. The aperture-diaphragm-side surface has a gentle change in radius of curvature from the optical axis to the periphery of the lens and has no inflection point, in other words, the surface has a shape having refractive power gradually changing from a center toward periphery. On the other hand, the other surface of the lens has a shape having small change in refractive power in the central part and big change in refractive power in the peripheral part except an area where on-axis rays pass, in other words, the surface has a shape having in which the refractive power is more changed in a peripheral region and, therefore, off-axis aberrations can be corrected well.

By constructing the aspherical lens as described above, aberration correction functions can be separated to two surfaces and, therefore, the change in radius of curvature (change in refractive power) in the central part and in the peripheral part of each surface can be smooth and gentle. As a result, degradation of optical quality caused by decentering produced in the manufacturing process that lenses are put into lens barrel can be suppressed and degradation of optical quality caused by decentering relative to each surface can also be suppressed.

In the present invention, however, high zoom ratio is achieved by correcting spherical aberration generated in each lens group within each group independently, it is desirable to perform adjustment of decentering of each lens group while manufacturing lens. For example, in the case of a lens group consisting of plural lens blocks, lenses are put in a lens barrel from both in front and behind, and the lens group is constructed such that an image of a reticle is formed by the lens group. In such a lens construction, adjustment of decentering can be performed by fixing a lens to the lens barrel when an image of the reticle becomes clear. Therefore, the product having stable optical quality can be provided to the customer.

According to another aspect of the present invention, it is desirable to apply a variable focal length optical system of the present invention to a five-lens-group type having, in order from object side, positive-negative-positive-positive-negative power arrangement. The variable focal length optical system includes, in order from object side, a first lens group G1 having a positive refractive power, a first auxiliary lens group GA having a negative refractive power, a second lens group G2 having a positive refractive power, a second auxiliary lens group GB having a positive refractive power, and a third lens group G3 having a negative refractive power. When a state of lens group positions is changed from a wide-angle end state to a telephoto end state, each lens group moves to the object side such a manner that an air gap between said first lens group G1 and said first auxiliary lens group GA increases, an air gap between said first auxiliary lens group GA and said second lens group G2 decreases, an air gap between said second lens group G2 and said second auxiliary lens group GB increases, and an air gap between said second auxiliary lens group GB and said third lens group G3 decreases. More preferably, an aperture diaphragm is arranged between said first auxiliary lens group GA and said second lens group G2, and said second lens group G2 is consisted of a double aspherical lens.

In such a optical system having a lot of movable lens group, since freedom of choice of zooming trajectory increases, variation of off-axis aberration while zooming can easily be corrected and it is suitable for an optical system having high zooming ratio. In the wide-angle end state, by arranging the first lens group G1 close to the first auxiliary lens group GA, the second lens group G2 close to the second auxiliary lens group GB, the first auxiliary lens group GA away from the second lens group G2, and the second auxiliary lens group GB away from the third lens group G3, the refractive power arrangement of whole optical system approaches symmetrical type and positive distortion can be corrected well.

By moving the first lens group G1 to the object side such that an air gap between the first lens group G1 and the first auxiliary lens group GA increases when a state of lens group positions is changed from a wide-angle end state to a telephoto end state, convergence effect of the first lens group G1 is made to be strong and the total lens length becomes short. At the same time, by moving the third lens group G3 to the object side, off-axis rays passing through the third lens group passes near the optical axis, and variation of off-axis aberration while zooming is suppressed.

In the present invention, it is preferable to move the first auxiliary lens group GA and the second auxiliary lens group GB in a body(integrally) while zooming. Since the number of movable lens group increases in the multi lens group type zoom lens, fluctuation of image position caused by stopping error of each lens group tends to occur, and the construction of lens barrel becomes to be complicated. In the present invention, the construction of lens barrel can be simplified by moving a plurality of lens groups in a body (integrally).

In the present invention, only the second lens group G2 is moved to the image side when a finite object is focused and the following conditional formula (5) is satisfied:

$$1/\{(1/\beta T)-\beta 2T\}^2<0.3 \quad (5)$$

where $\beta T$ denotes lateral magnification of the variable focal length optical system in the telephoto end state and $\beta 2T$ denotes lateral magnification of the second lens group G2 in the telephoto end state.

Conditional formula (5) defines an appropriate range of lateral magnification of the second lens group G2. Further, spaces can be used effectively by moving only the second lens group G2 to the image side while focusing on a finite object since the second lens group G2 moves near to the first auxiliary lens group GA when the focal length changes from the wide-angle end state to the telephoto end state, and the second lens group G2 moves near to the second auxiliary lens group GB while focusing on a finite object.

In the present invention, it is desirable to satisfy following conditional formula (6):

$$1.4<(\beta 2W/\beta 2T)/Z<3.0 \quad (6)$$

where $\beta 2W$ denotes lateral magnification of the second lens group G2 in the wide-angle end state, and Z denotes a zoom ratio (ft/fw).

Conditional formula (6) defines an appropriate range of the ratio of lateral magnification of the second lens group G2 in the wide-angle end state to that in the telephoto end state. By satisfying the conditional formula (6), the moving amount while focusing on a finite object in the telephoto becomes lager than that in the wide-angle end state, and the air gap between the second lens group G2 and the second auxiliary lens group GB becomes nearly constant while focusing on a finite object. Therefore, the space can further effectively be utilized.

In the present invention, since plastic materials can be molded with lower temperature than glass materials and is suitable for cost reduction, it is possible to reduce cost and weight by applying plastic materials for making lens. When lens barrels for holding lenses are made from plastic materials, since length of the lens barrel changes according to change in temperature, it is possible to mitigate the change in image plane caused by change in the length of the lens barrel according to change in temperature by means of using lenses made from plastics.

In the present invention, when the positive lens arranged in the third lens group G3 is made from plastic materials, both cost reduction and high optical quality can be achieved. This is the most desirable. Because an aspherical lens made from plastic materials is lighter than that from glass materials, and can reduce manufacturing cost. And because the area where light rays pass through is rather smaller relative to diameter of lenses, predetermined optical quality can be achieved without extra-high surface accuracy.

In the numerical examples according to the present invention described bellow, aspherical lenses are arranged in a second lens group G2 and a third lens group G3 respectively. By arranging an aspherical lens in the second lens group G2, negative spherical aberration independently produced by the second lens group G2 is corrected extremely well and variation of on-axis aberration produced while changing lens positions can be corrected well. By arranging an aspherical lens in the third lens group G3, variation of off-axis aberrations produced when the focal length state changes from the wide-angle end state to the telephoto end state can be corrected well.

In the following numerical examples, although each optical system consists of three movable lens groups, it is obvious to the present invention that another lens group can be added to a space between each lens group, or another lens group can easily be added to the image side or to the object side of the optical system.

From another point of view, it is possible for the present invention that the optical system is made to be an anti-vibration(vibration reduction) optical system preventing image blurring caused by camera shake, or the like, liable to be occurred to a high-zoom-ratio lens while taking picture. In order to prevent this, a moving detector detecting camera shake and a driving unit are combined to the optical system, and the optical system is constructed such that a whole lens group or a portion of a lens group comprising the optical system can be decentered as a decentering lens group. Image blurring can be corrected by detecting camera shake by the moving detector, decentering the decentering lens group by the driving unit, and shifting image by the decentering lens group. In this construction, a high zoom ratio optical system (variable focal length optical system) can be made to be an anti-vibration (vibration reduction) optical system being able to prevent image blurring.

Numerical examples according to the present invention are described bellow.

NUMERICAL EXAMPLE 1

Figure 1B:
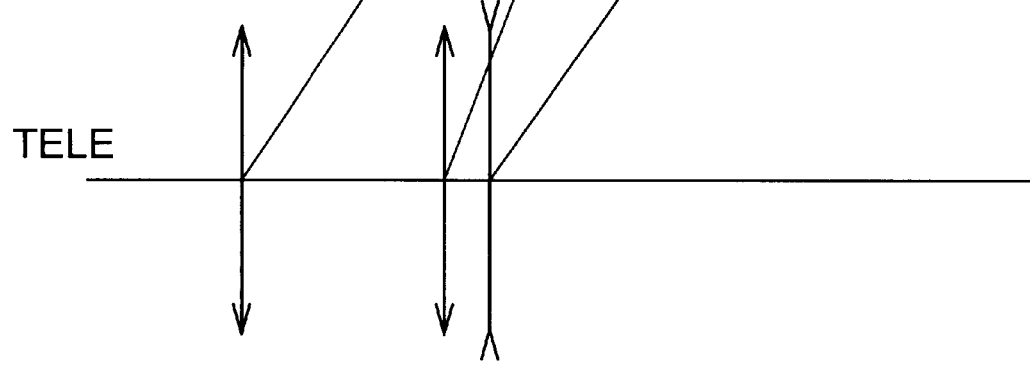

FIGS. 1A and 1B are diagrams showing distribution of refractive power of a variable focal length optical system according to Numerical Example 1 of the present invention. In the FIGS. 1A and 1B, WIDE denotes the wide-angle end state and TELE denotes the telephoto end state. The variable focal length optical system consists of, in order from object side, a first lens group G1 having a positive refracting power, a second lens group G2 having a positive refractive power, and a third lens group G3 having a negative refractive power. When the state of lens group position changes from the wide-angle end state to the telephoto end state, all the lens groups move to the object side such that an air gap between the first lens group G1 and the second lens group G2 increases, and an air gap between the second lens group G2 and the third lens group G3 decreases.

Figure 2:
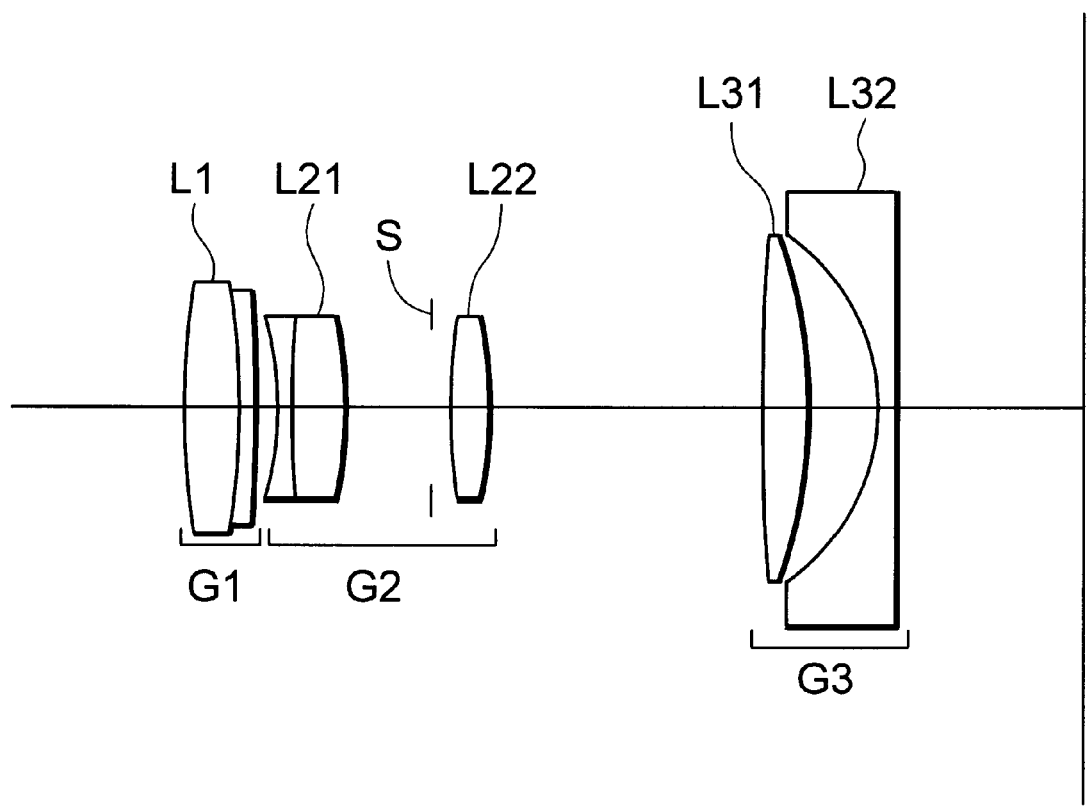
FIG. 2 is a diagram showing a lens construction of the variable focal length optical system according to the Numerical Example 1 of the present invention.
Figures 3A, 3B, 3C, 3D:
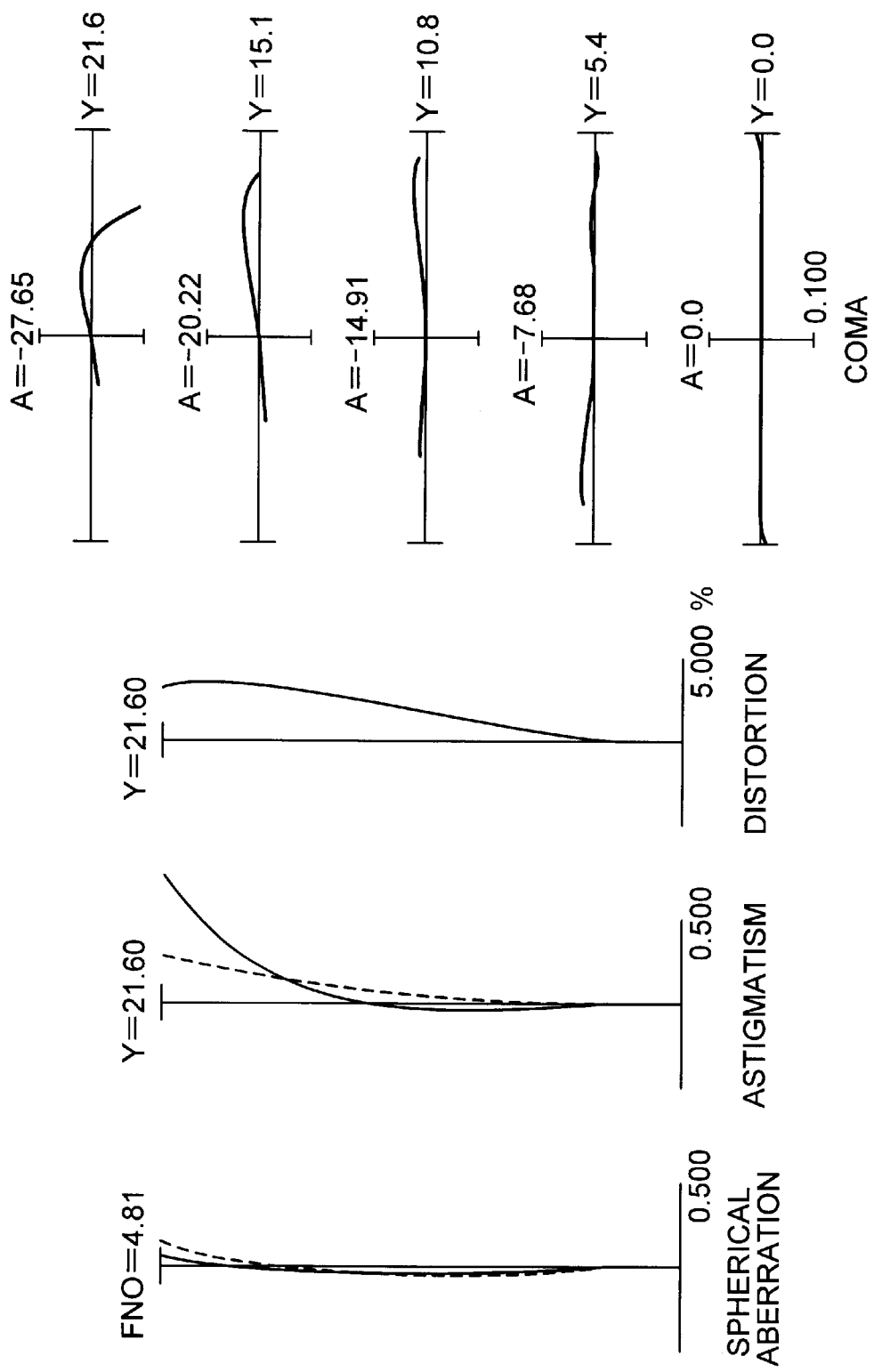
FIGS. 3A to 3D show various aberrations of a variable focal length optical system according to Numerical Example 1 of the present invention focused on infinite object in the wide-angle end state.
Figures 4A, 4B, 4C, 4D:
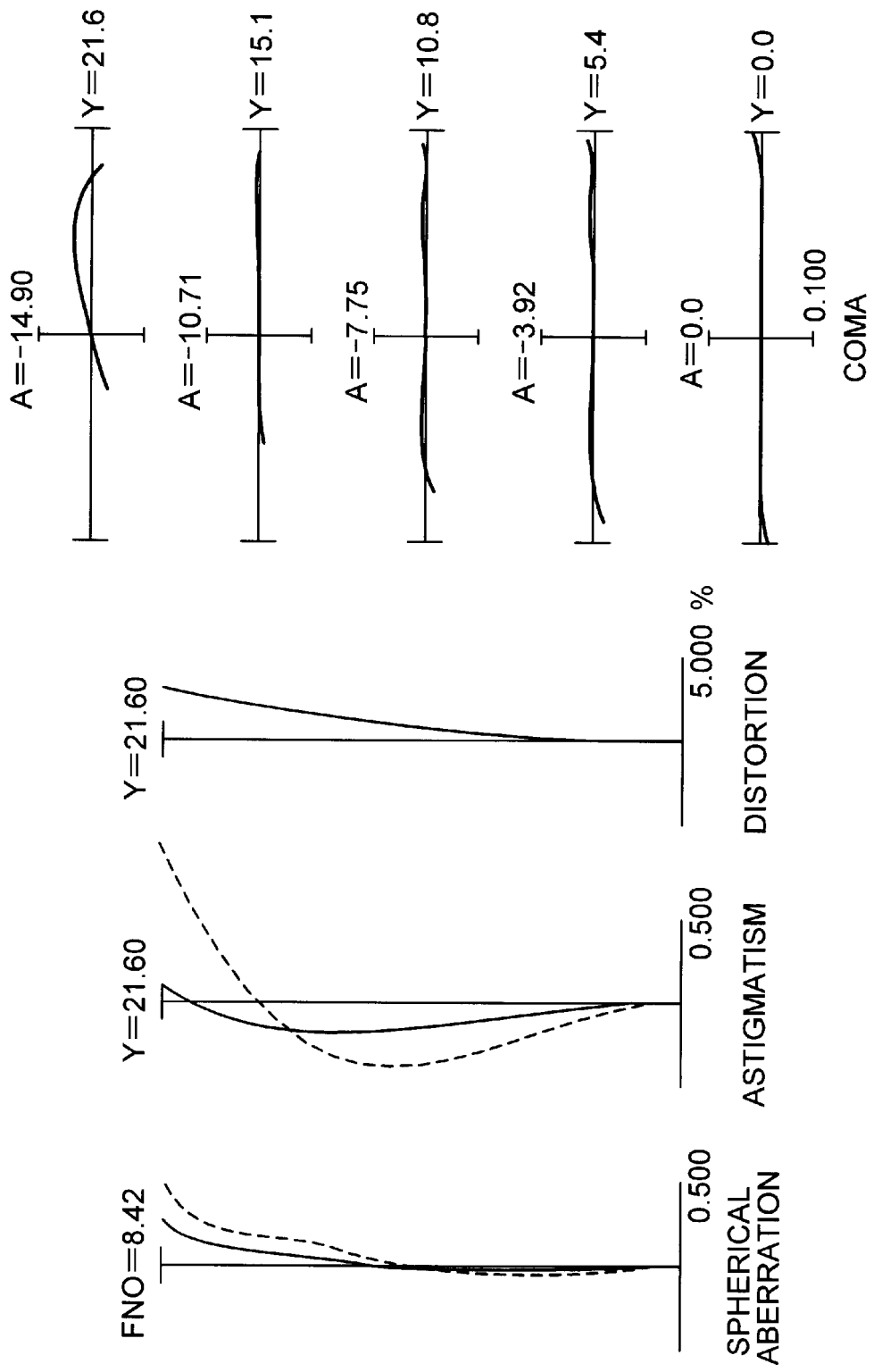
FIGS. 4A to 4D show various aberrations of a variable focal length optical system according to Numerical Example 1 of the present invention focused on infinite object in the intermediate focal length.

FIG. 2 is a diagram showing a lens construction of the variable focal length optical system according to the Numerical Example 1 of the present invention. The first lens group G1 has, in order from object side, a cemented lens L1 consisting of a double convex lens and a negative meniscus lens having a concave surface facing to the object side. The second lens group G2 has, in order from object side, a cemented lens L21 consisting of a double concave negative lens and a double convex positive lens, and a double convex positive lens L22. The third lens group G3 has, in order from object side, a double convex positive lens L31 and a negative meniscus lens L32 having a concave surface facing to the object side. An aperture diaphragm S is arranged between the lens elements L21 and L22, and is moved with the second lens group G2 in a body(integrally) while zooming. In the Numerical Example 1, the lens element L21 is a negative sub lens group, and L22 is a positive sub lens group.

Various values associated with Numerical Example 1 are listed in Table 1. In Table 1, f denotes, in mm, the focal length, FNO denotes the f-number, and 2ω denotes an angle of view. In addition, values indicated as the refractive index are values for the d-line (λ=587.6 nm). An aspherical surface is expressed by the following equation:

$$x = cy^2/\{1+(1-\kappa c^2 y^2)^{1/2}\} + C_4 y^4 + C_6 y^6 + \ldots$$

where y denotes the height in a vertical direction from the optical axis, c denotes the radius of curvature, κ denotes the conical coefficient, C4, C6, ... denote aspherical coefficient. In addition, the same symbol as denoted in Numerical Example 1 is used in aspherical equations of following Numerical Examples.

TABLE 1

| | f | 39.90 | 78.73 | 142.50 |
|---|---|---|---|---|
| | FNO | 5.90 | 9.34 | 12.01 |
| | 2ω | 55.30° | 29.99° | 18.88° |

| surface number | radius of curvature | interval between surfaces | refractive index | Abbe number |
|---|---|---|---|---|
| 1 | 32.8698 | 3.10 | 1.49700 | 81.61 |
| 2 | −40.0414 | 0.80 | 1.64769 | 33.84 |
| 3 | −93.7341 | (D3) | 1.0 | |
| 4 | −17.0426 | 0.80 | 1.83481 | 42.72 |

TABLE 1-continued

| 5 | 92.8430 | 3.00 | 1.56732 | 42.85 |
|---|---|---|---|---|
| 6 | −25.6159 | 5.00 | 1.0 | |
| 7 | ∞ | 1.00 | 1.0 | (aperture diaphragm) |
| 8 | 38.6993 | 2.15 | 1.51450 | 63.05 |
| 9 | −18.4256 | (D9) | 1.0 | |
| 10 | 1263.7879 | 2.50 | 1.68893 | 31.16 |
| 11 | −38.0314 | 4.00 | 1.0 | |
| 12 | −11.8899 | 1.00 | 1.81550 | 44.54 |
| 13 | −1902.7573 | (Bf) | 1.0 | |

Aspherical surface data of the aspherical surfaces, 8, 9, 10, and 11.

surface number:8

η: 2.5351
C4: +3.3673 × 10$^{-5}$
C6: +1.2901 × 10$^{-6}$
C8: −4.2454 × 10$^{-8}$
C10: +8.5829 × 10$^{-10}$ surface number:9

η: −0.0338
C4: +4.9416 × 10$^{-5}$
C6: +1.8617 × 10$^{-6}$
C8: −7.7015 × 10$^{-8}$
C10: +1.5279 × 10$^{-9}$ surface number:10

η: 11.0000
C4: +1.9481 × 10$^{-5}$
C6: +1.1381 × 10$^{-6}$
C8: −2.1373 × 10$^{-8}$
C10: +1.0299 × 10$^{-10}$ surface number:11

η: 1.1282
C4: −3.8424 × 10$^{-5}$
C6: +1.2406 × 10$^{-6}$
C8: −2.3479 × 10$^{-8}$
C10: +8.1913 × 10$^{-11}$

Variable intervals during zooming

| f | 39.9000 | 78.7326 | 142.5033 |
|---|---|---|---|
| D3 | 1.3000 | 6.5074 | 14.8317 |
| D9 | 15.7443 | 6.9569 | 0.8000 |
| Bf | 10.2586 | 36.6780 | 71.0200 |

Values for above conditions (1) Da/f = 0.007 (Tele) 0.025 (wide)
(2) (Ra + Rb)/(Ra − Rb) = 0.355
(3) Db/fw = 0.054
(4) f2/(fw · ft)$^{1/2}$ = 0.506

FIGS. 3A through 5D show various aberrations associated with the Numerical Example 1 of the present invention focused on infinite object. FIGS. 3A to 3D show various aberrations in the wide-angle end state (f=39.90), FIGS. 4A to 4D show in the intermediate focal length (f=78.73), and FIGS. 5A to 5D show in the telephoto end state (f=142.50), respectively. In the diagram showing spherical aberration, a solid line indicates spherical aberration, a broken line indicates the sine condition, and Y denotes image height. In the diagram showing astigmatism, a solid line indicates a sagittal image plane, a broken line indicates a meridional image plane, and d indicates aberration for d-line (λ=587.6 nm). In the diagram showing coma, coma relative to the image height Y=0, 5.4, 10.8, 15.1, and 21.6 are shown. A denotes an angle of view. In the respective diagrams of following Numerical Examples, the same symbols as used in Numerical Example 1 will be used. As is apparent from the respective diagrams showing the various aberrations, excellent compensation is made for the various aberrations at the respective focal lengths.

NUMERICAL EXAMPLE 2

Figure 6A:
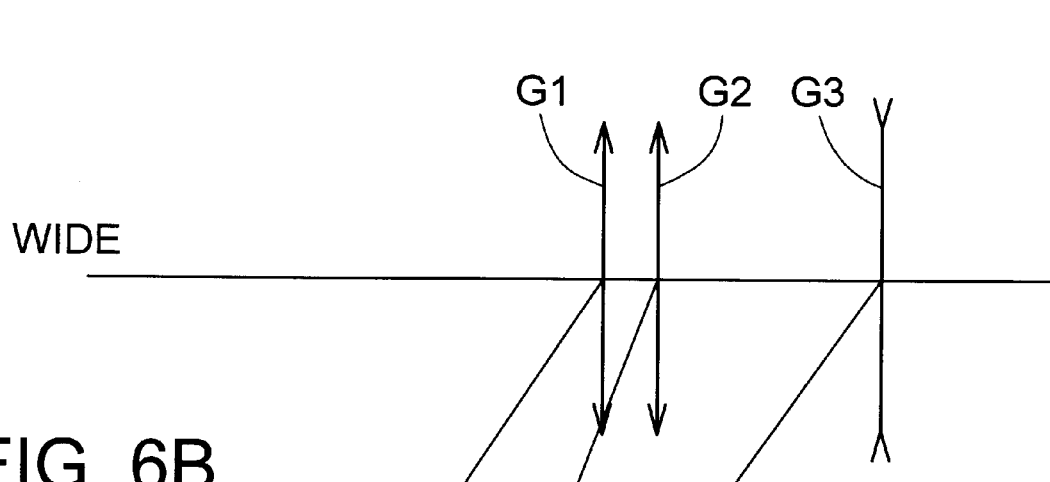
FIGS. 6A and 6B are diagrams showing distribution of refractive power of a variable focal length optical system according to Numerical Example 2 of the present invention.
Figure 6B:
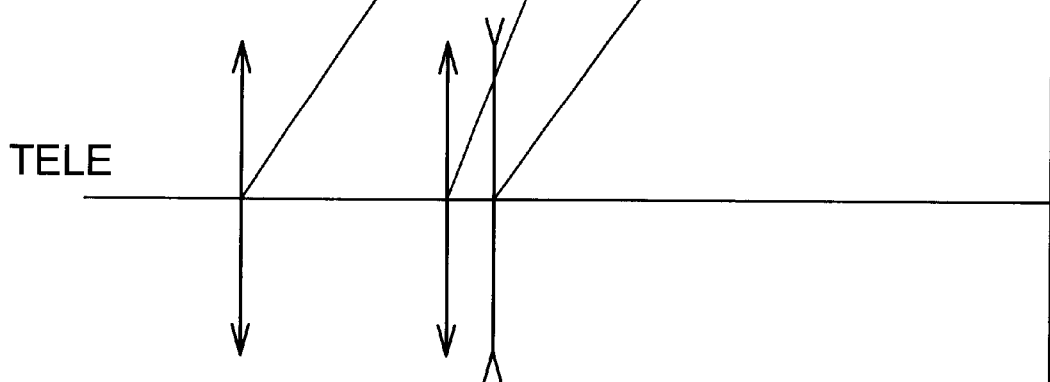

FIGS. 6A and 6B are diagram showing distribution of refractive power of a variable focal length optical system according to Numerical Example 2 of the present invention. The variable focal length optical system consists of, in order from object side, a first lens group G1 having a positive refracting power, a second lens group G2 having a positive refractive power, and a third lens group G3 having a negative refractive power. When the state of lens group position changes from the wide-angle end state (WIDE) to the telephoto end state (TELE), all the lens groups move to the object side such that an air gap between the first lens group G1 and the second lens group G2 increases, and an air gap between the second lens group G2 and the third lens group G3 decreases.

Figure 7:
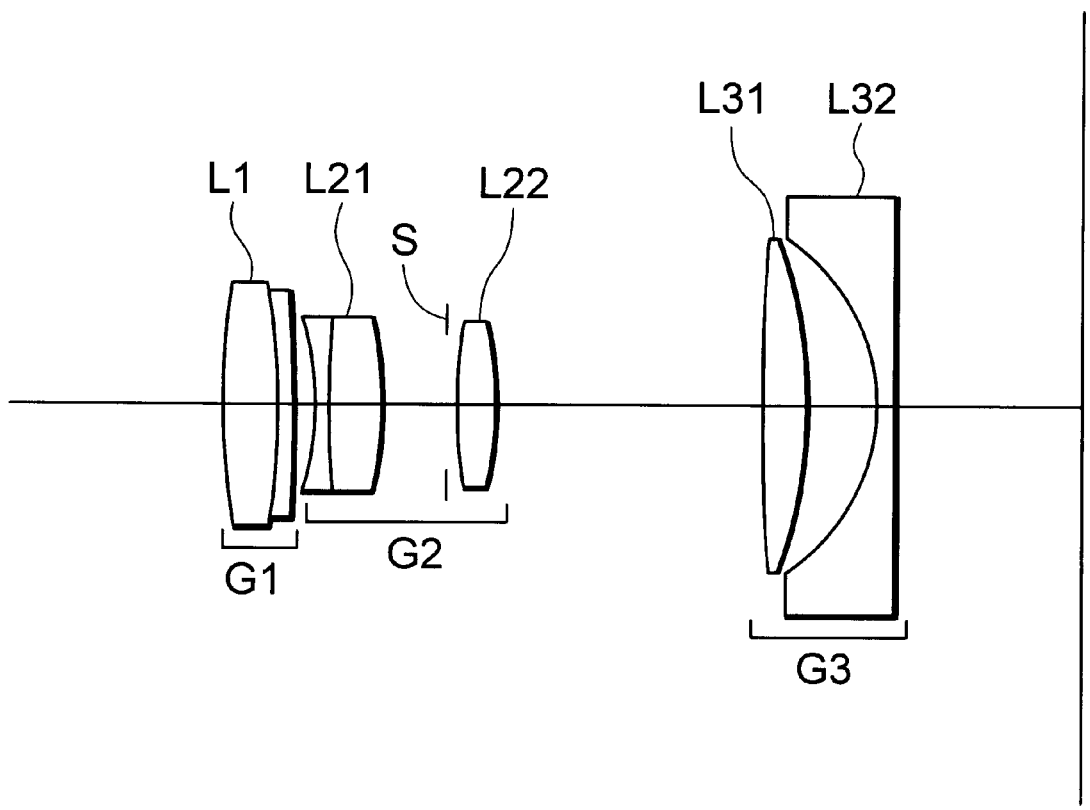
FIG. 7 is a diagram showing a lens construction of the variable focal length optical system according to the Numerical Example 2 of the present invention.
Figures 8A, 8B, 8C, 8D:
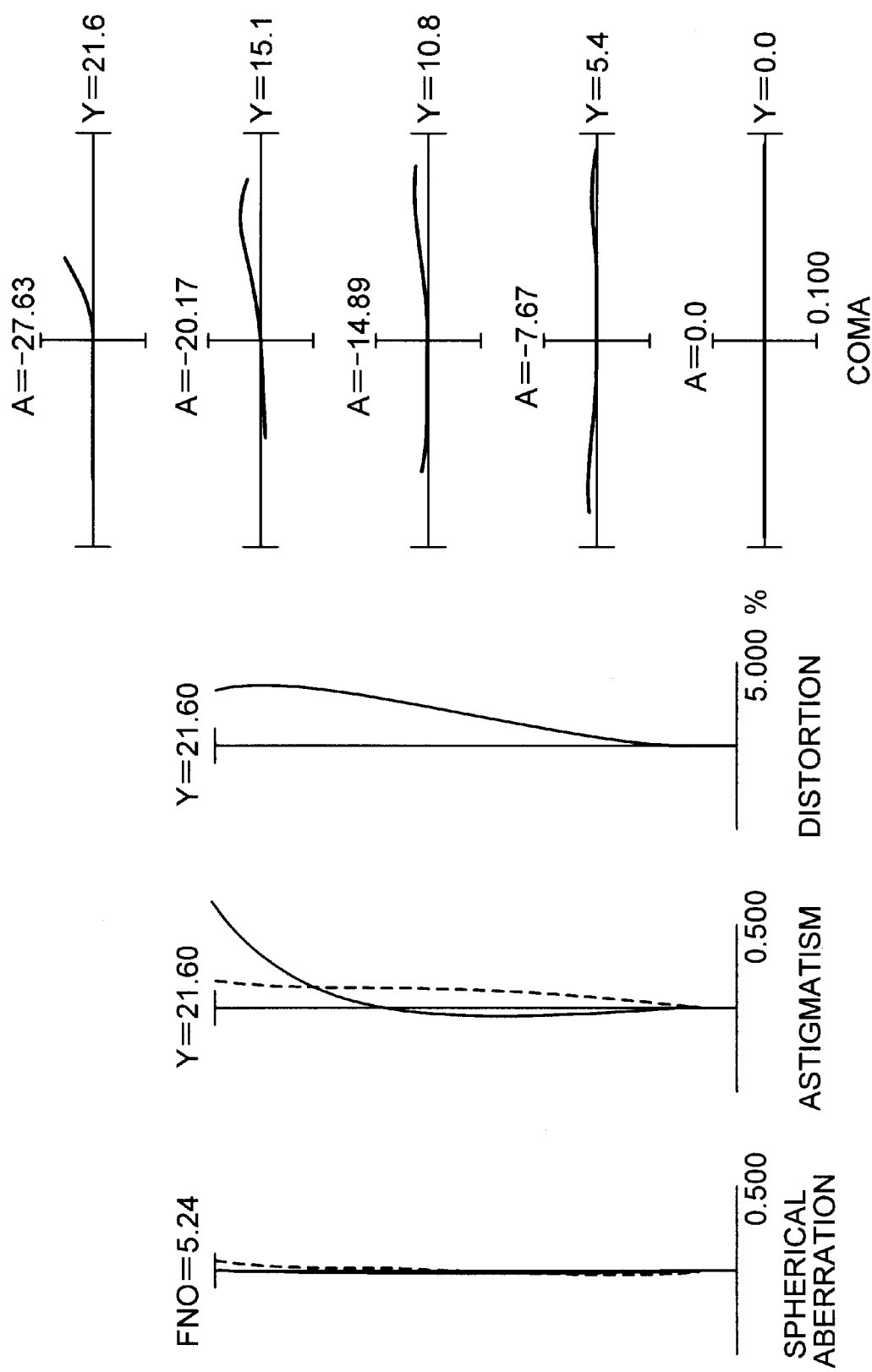
FIGS. 8A to 8D show various aberrations of a variable focal length optical system according to Numerical Example 2 of the present invention focused on infinite object in the wide-angle end state.
Figures 9A, 9B, 9C, 9D:
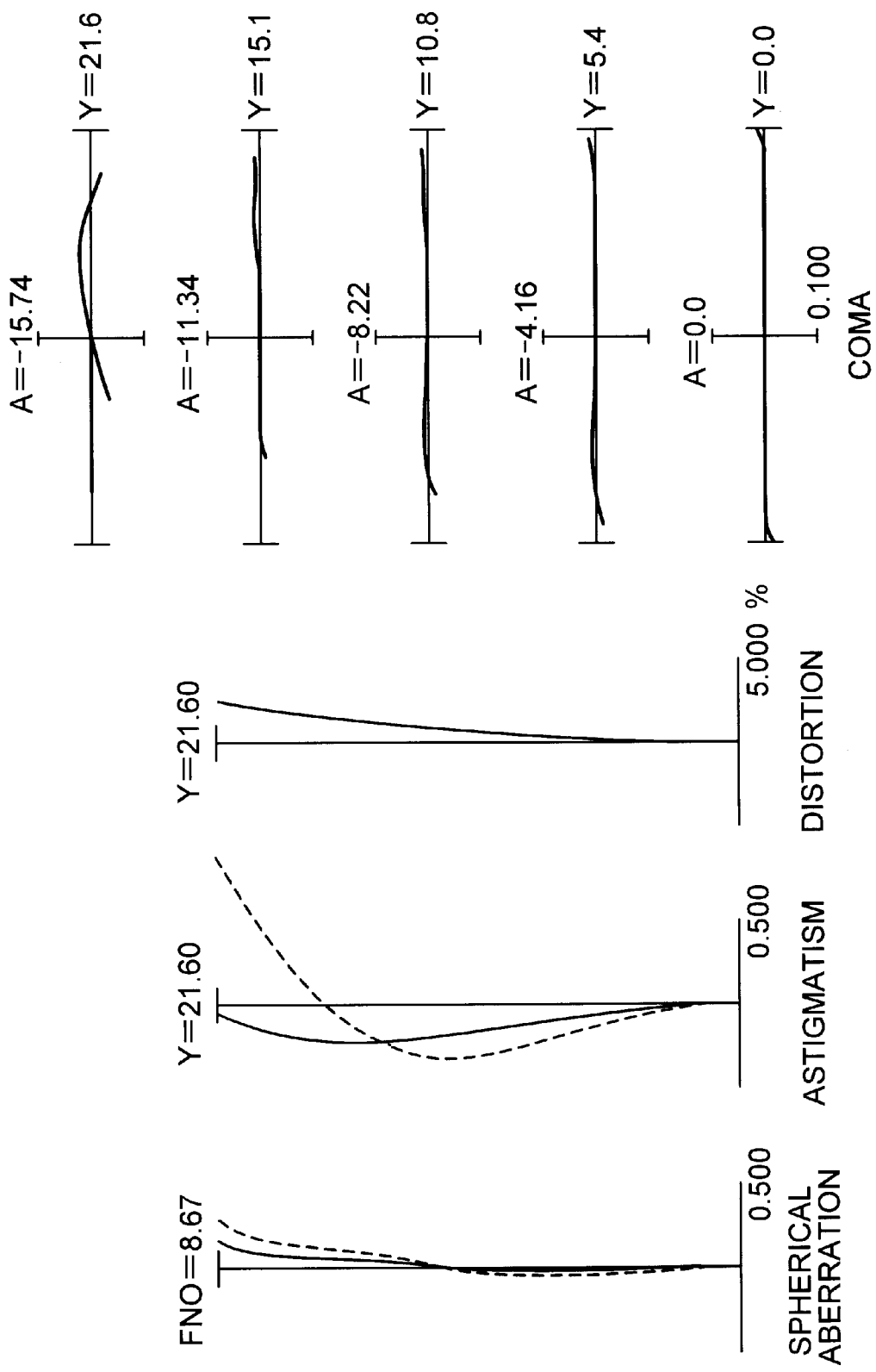
FIGS. 9A to 9D show various aberrations of a variable focal length optical system according to Numerical Example 2 of the present invention focused on infinite object in the intermediate focal length.
Figures 10A, 10B, 10C, 10D:
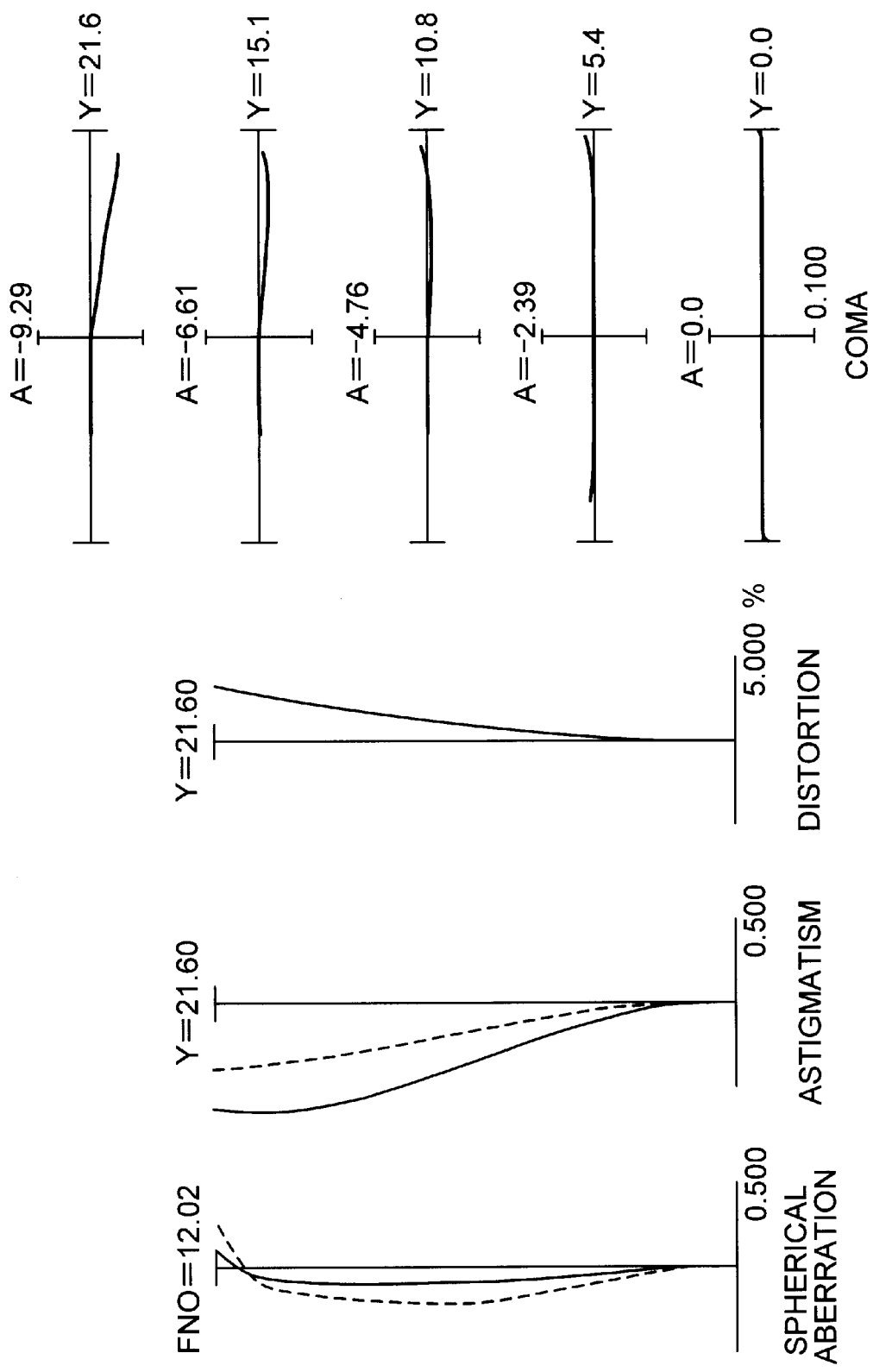
FIGS. 10A to 10D show various aberrations of a variable focal length optical system according to Numerical Example 2 of the present invention focused on infinite object in the telephoto end state.

FIG. 7 is a diagram showing a lens construction of the variable focal length optical system according to the Numerical Example 2 of the present invention. The first lens group G1 has, in order from object side, a cemented lens L1 consisting of a double convex lens and a negative meniscus lens having a concave surface facing to the object side. The second lens group G2 has, in order from object side, a cemented lens L21 consisting of a double concave negative lens and a double convex positive lens, and a double convex positive lens L22. The third lens group G3 has, in order from object side, a double convex positive lens L31 and a negative meniscus lens L32 having a concave surface facing to the object side. An aperture diaphragm S is arranged between the lens elements L21 and L22, and is moved with the second lens group G2 in a body(integrally) while zooming. In the Numerical Example 2, the lens element L21 is a negative sub lens group, and L22 is a positive sub lens group.

Various values associated with Numerical Example 2 are listed in Table 2.

TABLE 2

| f | 39.90 | 74.12 | 129.00 |
|---|---|---|---|
| FNO | 5.23 | 8.63 | 12.00 |
| 2ω | 55.26° | 31.47° | 18.57° |

| surface number | radius of curvature | interval between surfaces | refractive index | Abbe number |
|---|---|---|---|---|
| 1 | 26.4241 | 3.20 | 1.49700 | 81.61 |
| 2 | −41.4416 | 0.80 | 1.69895 | 30.05 |
| 3 | −90.8209 | (D3) | 1.0 | |
| 4 | −16.1776 | 0.80 | 1.83481 | 42.72 |
| 5 | 37.1694 | 3.00 | 1.59551 | 39.23 |
| 6 | −30.1045 | 3.25 | 1.0 | |
| 7 | 0.0000 | 1.00 | 1.0 | (aperture diaphragm) |
| 8 | 35.0282 | 2.10 | 1.51450 | 63.05 |
| 9 | −16.2556 | (D9) | 1.0 | |
| 10 | −202.7946 | 2.40 | 1.68893 | 31.16 |
| 11 | −33.8494 | 3.85 | 1.0 | |
| 12 | −11.4234 | 1.00 | 1.80400 | 46.58 |
| 13 | −187.8519 | (Bf) | 1.0 | |

Aspherical surface data of the aspherical surfaces, 8, 9, 10, and 11.

surface number:8

$\eta$: +6.6429
C4: +4.3684 × $10^{-5}$
C6: +3.8891 × $10^{-6}$
C8: −1.4583 × $10^{-7}$
C10: +5.0827 × $10^{-9}$

TABLE 2-continued surface number:9

$\eta$: −1.2589
C4: +3.5316 × $10^{-5}$
C6: +4.7201 × $10^{-6}$
C8: −1.9727 × $10^{-7}$
C10: +6.3548 × $10^{-9}$ surface number:10

$\eta$: −9.0000
C4: +3.2681 × $10^{-5}$
C6: +1.1056 × $10^{-6}$
C8: −2.2126 × $10^{-8}$
C10: ++1.2038 × $10^{-10}$ surface number:11

$\eta$: 0.6596
C4: −2.8972 × $10^{-5}$
C6: +1.2400 × $10^{-6}$
C8: −2.5194 × $10^{-8}$
C10: +9.8036 × $10^{-11}$ Variable intervals during zooming

| f | 39.9000 | 74.1201 | 129.0071 |
|---|---|---|---|
| D3 | 1.3000 | 5.5248 | 12.2785 |
| D9 | 15.4437 | 7.2327 | 1.0000 |
| Bf | 10.4618 | 34.2273 | 65.33252 |

Values for above conditions (1) Da/f = 0.008 (Tele) 0.025 (wide)
(2) (Ra + Rb)/(Ra − Rb) = 0.366
(3) Db/fw = 0.053
(4) f2/(fw · ft)$^{1/2}$ = 0.570

FIGS. 8A through 10D shows various aberrations associated with the Numerical Example 2 of the present invention focused on infinite object. FIGS. 8A to 8D show various aberrations in the wide-angle end state (f=39.90), FIGS. 9A to 9D show in the intermediate focal length (f=74.12), and FIGS. 10A to 10D show in the telephoto end state (f=129.00), respectively. As is apparent from the respective diagrams showing the various aberrations, excellent compensation is made for the various aberrations at the respective focal lengths.

NUMERICAL EXAMPLE 3

Figures 11A, 11B:
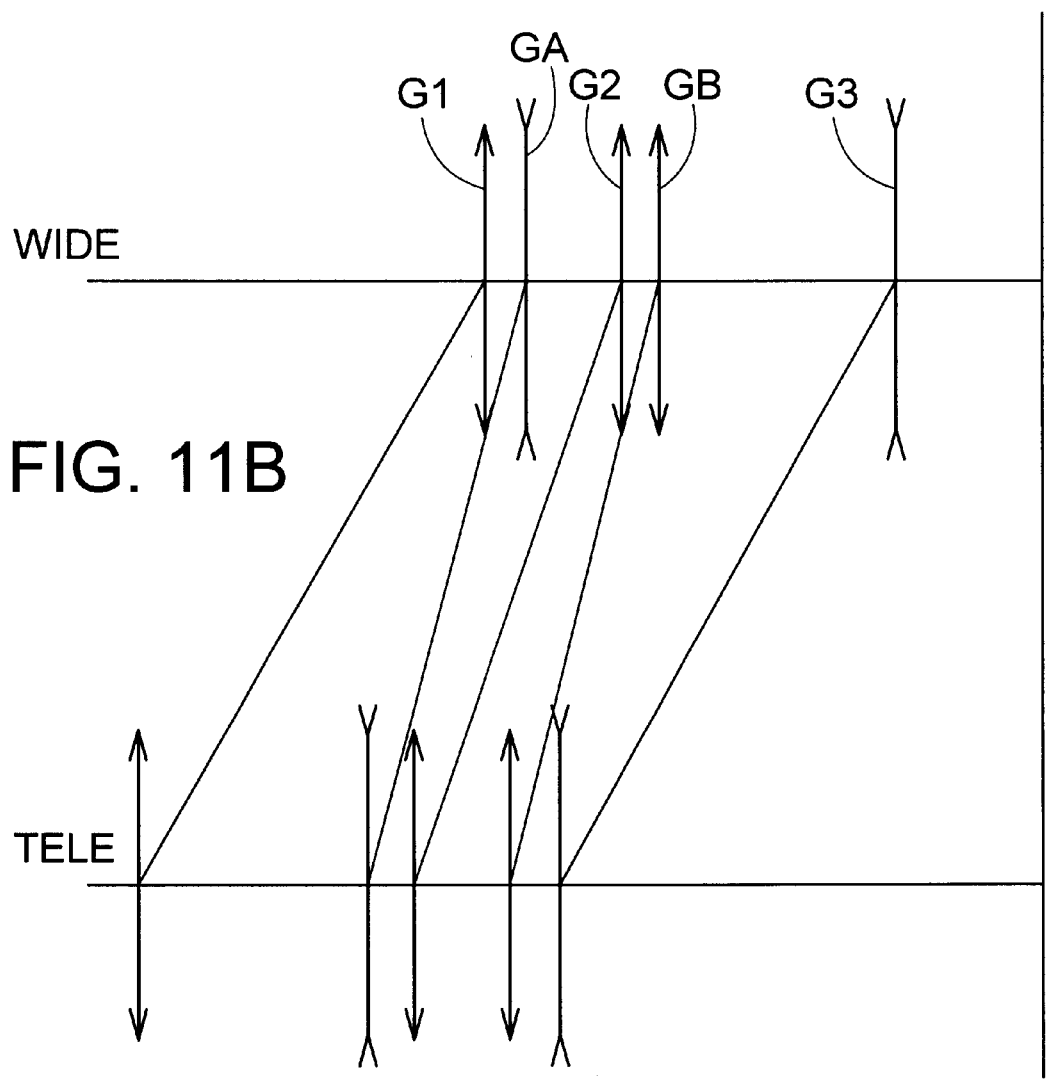
FIGS. 11A and 11B are diagrams showing distribution of refractive power of a variable focal length optical system according to Numerical Example 3 of the present invention.

FIGS. 11A and 11B are diagrams showing distribution of refractive power of a variable focal length optical system according to Numerical Example 3 of the present invention. The variable focal length optical system consists of, in order from object side, a first lens group G1 having a positive refracting power, a first auxiliary lens group GA having a negative refractive power, a second lens group G2 having a positive refractive power, a second auxiliary lens group GB having a positive refractive power, and a third lens group G3 having a negative refractive power. When the state of lens group position changes from the wide-angle end state to the telephoto end state, all the lens groups move to the object side such that an air gap between the first lens group G1 and the first auxiliary lens group GA increases, an air gap between the first auxiliary lens group GA and the second lens group G2 decreases, an air gap between the second lens group G2 and the second auxiliary lens group GB increases, and an air gap between the second auxiliary lens group GB and the third lens group G3 decreases. The first auxiliary lens group GA and the second auxiliary lens group GB move in a body(integrally), an air gap between the first lens group G1 and the second lens group G2 increases, and an air gap between the second lens group G2 and the third lens group G3 decreases.

Figure 12:
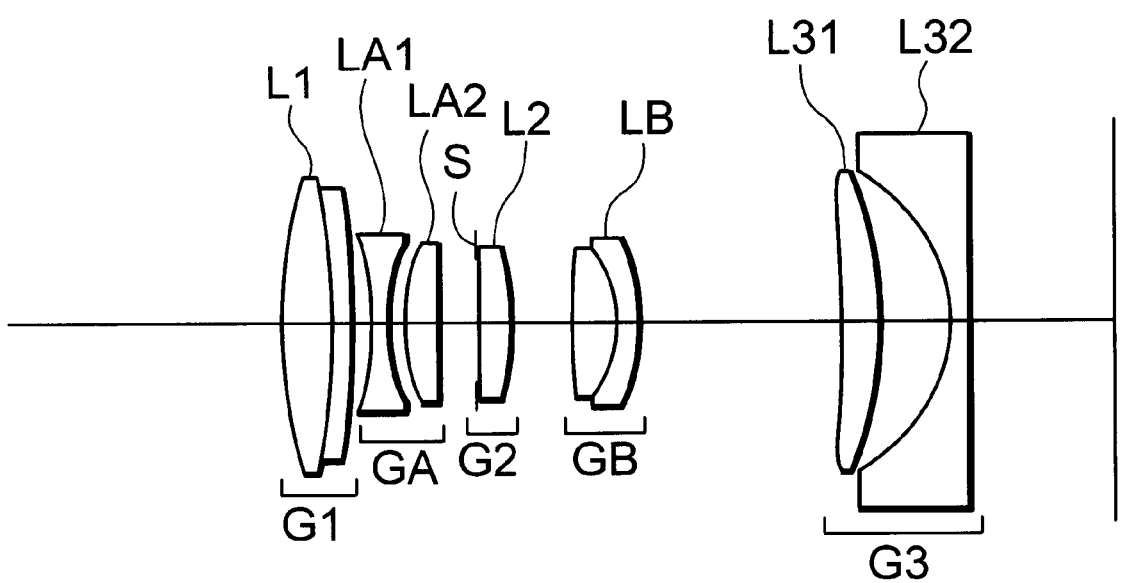
FIG. 12 is a diagram showing a lens construction of the variable focal length optical system according to the Numerical Example 3 of the present invention.
Figures 14A, 14B, 14C, 14D:
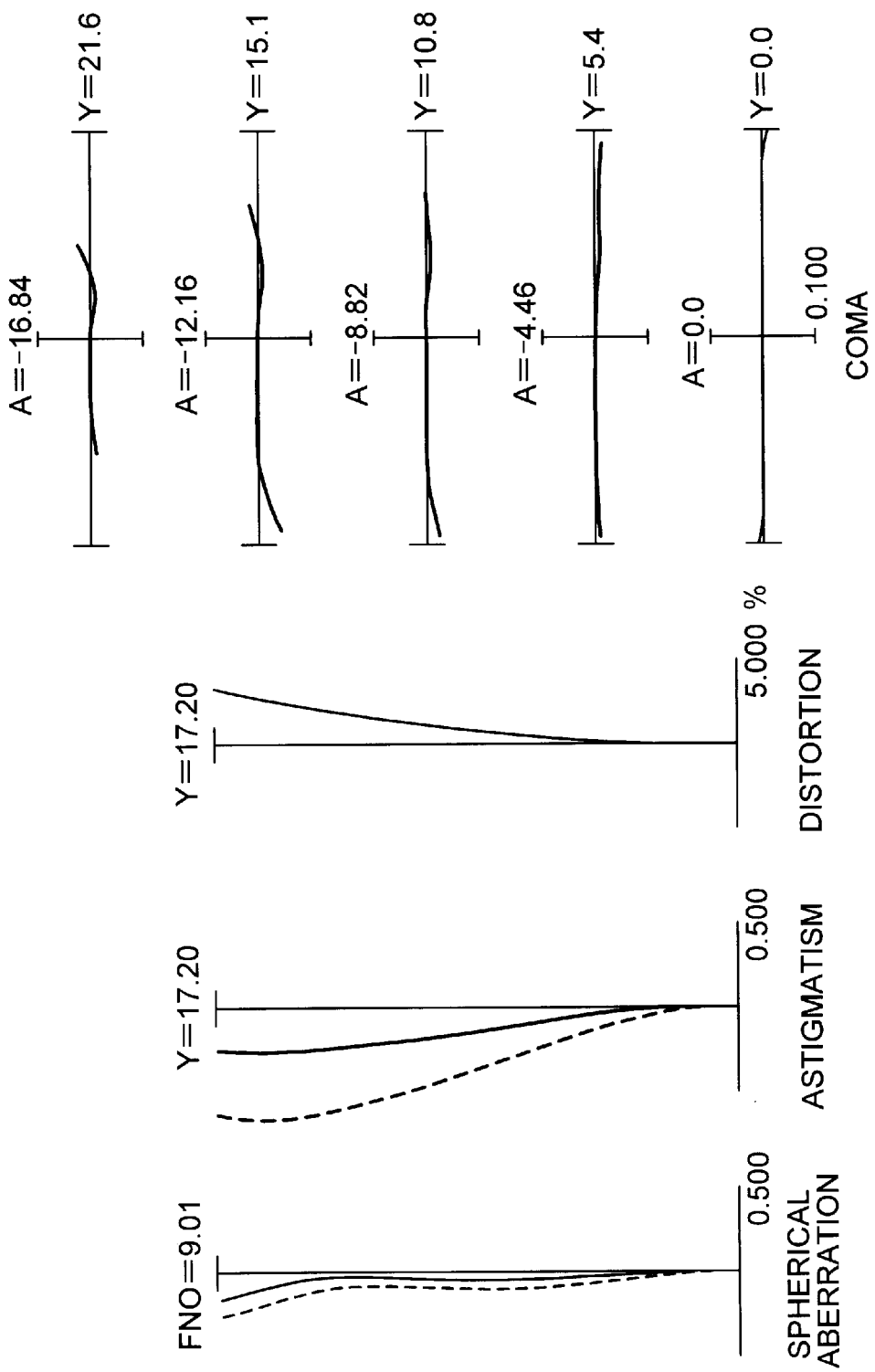
FIGS. 14A to 14D show various aberrations of a variable focal length optical system according to Numerical Example 3 of the present invention focused on infinite object in the intermediate focal length.

FIG. 12 is a diagram showing a lens construction of the variable focal length optical system according to the Numerical Example 3 of the present invention. The first lens group G1 has, in order from object side, a cemented positive lens L1 consisting of a double convex lens and a negative meniscus lens having concave surface facing to the object side. The first auxiliary lens group GA has, in order from object side, a double concave lens LA1 and a positive meniscus lens LA2 having a convex surface facing to the object side. The second lens group G2 has a positive lens L2 having a convex surface facing to the image side. The second auxiliary lens group GB has, in order from object side, a cemented positive lens LB consisting of a double convex lens and a negative meniscus lens having a concave surface facing to the object side. The third lens group G3 has, in order from object side, a positive lens L31 having a convex surface facing to the image side and a negative lens L32 having a concave surface facing to the object side. An aperture diaphragm S is arranged to the object side of the second lens group G2.

Various values associated with Numerical Example 3 are listed in Table 3.

TABLE 3

| f | 26.25 | 55.00 | 95.00 |
|---|---|---|---|
| FNO | 5.86 | 9.05 | 12.00 |
| 2ω | 67.14° | 33.68° | 20.03° |

| surface number | radius of curvature | interval between surfaces | refractive index | Abbe number |
|---|---|---|---|---|
| 1 | 26.0340 | 2.70 | 1.49700 | 81.61 |
| 2 | −32.5241 | 0.80 | 1.64769 | 33.84 |
| 3 | −56.2360 | (D3) | 1.0 | |
| 4 | −18.8687 | 0.80 | 1.83481 | 42.72 |
| 5 | 9.0909 | 0.90 | 1.0 | |
| 6 | 10.3955 | 1.65 | 1.76182 | 26.55 |
| 7 | 91.9289 | (D7) | 1.0 | |
| 8 | ∞ | 0.20 | 1.0 | (aperture diaphrgm) |
| 9 | 334.3465 | 1.40 | 1.58913 | 61.24 |
| 10 | −19.2000 | (D10) | 1.0 | |
| 11 | 39.8501 | 2.35 | 1.54072 | 47.18 |
| 12 | −6.2520 | 0.80 | 1.84666 | 23.83 |
| 13 | −10.7425 | (D13) | 1.0 | |
| 14 | −59.6482 | 2.20 | 1.68893 | 31.16 |
| 15 | −21.1524 | 3.70 | 1.0 | |
| 16 | −8.7546 | 1.00 | 1.77250 | 49.61 |
| 17 | −120.7717 | (Bf) | 1.0 | |

Aspherical surface data of the aspherical surfaces, 9, 10, and 14.

surface number:9

η: −2.2024
C4: −3.1770 × $10^{-4}$
C6: +2.8515 × $10^{-5}$
C8: −3.1754 × $10^{-6}$
C10: +9.0472 × $10^{-8}$ surface number:10

η: +1.3792
C4: −2.9190 × $10^{-4}$
C6: +2.7696 × $10^{-5}$
C8: −3.1132 × $10^{-6}$
C10: +8.916 × $10^{-8}$ surface number:14

η: −8.5254
C4: +8.1870 × $10^{-5}$
C6: +3.7366 × $10^{-7}$
C8: −2.1827 × $10^{-9}$
C10: +2.1008 × $10^{-10}$

Variable intervals during zooming

TABLE 3-continued

| f | 26.2500 | 55.0000 | 95.0000 |
|---|---|---|---|
| D3 | 0.8000 | 7.3816 | 11.7074 |
| D7 | 2.3248 | 1.6134 | 0.5000 |
| D10 | 3.3752 | 4.0866 | 5.2000 |
| D13 | 10.6592 | 3.9551 | 0.6000 |
| Bf | 7.8938 | 27.0626 | 48.4925 |

Values for above conditions (1) Da/f = 0.002 (Tele) 0.008 (wide)
(2) (Ra + Rb)/(Ra − Rb) = 0.891
(3) Db/fw = 0.053
(5) $1/\{(1/\beta T) - \beta 2T\}^2 = 0.039$
(6) (β2W/β2T)/Z = 2.439

FIGS. 13A through 15D shows various aberrations associated with the Numerical Example 3 of the present invention focused on infinite object. FIGS. 13A to 13D show various aberrations in the wide-angle end state (f=26.25), FIGS. 14A to 14D show in the intermediate focal length (f=55.00), and FIGS. 15A to 15D show in the telephoto end state (f=95.00), respectively. As is apparent from the respective diagrams showing the various aberrations, excellent compensation is made for the various aberrations at the respective focal lengths.

Table 4 through 7 are numerical tables of double aspherical lenses according to the present invention. Each table shows a shape of a double aspherical lens arranged in the vicinity of an aperture diaphragm. The reference symbol H denotes, in mm, a height from the optical axis, SAG denotes, in mm, sag amount (displacement along the optical axis between a plane tangent to the lens surface at the vertex, which is on the optical axis, and the lens surface), D denotes, in mm, a difference between a sag amount relative to aspherical surface and that to standard spherical surface. The following equation is satisfied:

D=SAG (aspherical)−SAG (spherical).

Table 4 shows an aspherical surface near to the aperture diaphragm (Rf surface) associated with the Numerical Example 1. Table 5 shows an aspherical surface away from the aperture diaphragm (Rr surface) associated with the Numerical Example 1. Table 6 shows an aspherical surface near to the aperture diaphragm (Rf surface) associated with the Numerical Example 2. Table 7 shows an aspherical surface away from the aperture diaphragm (Rr surface) associated with the Numerical Example 2.

TABLE 4

| H | SAG | D |
|---|---|---|
| 0.1071 | 0.000148 | 0.000000 |
| 0.2143 | 0.000593 | 0.000000 |
| 0.3214 | 0.001335 | 0.000000 |
| 0.4286 | 0.002374 | 0.000001 |
| 0.5378 | 0.003711 | 0.000003 |
| 0.6429 | 0.005346 | 0.000006 |
| 0.7500 | 0.007280 | 0.000012 |
| 0.8571 | 0.009514 | 0.000020 |
| 0.9643 | 0.012049 | 0.000033 |
| 1.0714 | 0.014885 | 0.000051 |
| 1.1786 | 0.018025 | 0.000075 |
| 1.2857 | 0.021470 | 0.000107 |
| 1.3929 | 0.025222 | 0.000148 |
| 1.5000 | 0.029282 | 0.000201 |
| 1.6071 | 0.033653 | 0.000267 |
| 1.7143 | 0.038337 | 0.000349 |

TABLE 4-continued

| H | SAG | D |
|---|-----|---|
| 1.8214 | 0.043337 | 0.000450 |
| 1.9286 | 0.048656 | 0.0000571 |
| 2.0357 | 0.054296 | 0.000716 |
| 2.1429 | 0.060261 | 0.000888 |
| 2.2500 | 0.066554 | 0.001091 |
| 2.3571 | 0.073180 | 0.001328 |
| 2.4643 | 0.080143 | 0.001603 |
| 2.5714 | 0.087446 | 0.001921 |
| 2.6786 | 0.095096 | 0.002286 |
| 2.7857 | 0.103095 | 0.002702 |
| 2.8929 | 0.111451 | 0.003176 |
| 3.0000 | 0.120168 | 0.003711 |
| 3.1071 | 0.129252 | 0.004315 |
| 3.2143 | 0.138709 | 0.004992 |
| 3.3214 | 0.148547 | 0.005750 |
| 3.4286 | 0.158771 | 0.006595 |
| 3.5357 | 0.169390 | 0.007533 |
| 3.6429 | 0.180411 | 0.008574 |
| 3.7500 | 0.191842 | 0.009724 |
| 3.8571 | 0.203693 | 0.010993 |
| 3.9643 | 0.215973 | 0.012390 |
| 4.0714 | 0.228693 | 0.013926 |
| 4.1786 | 0.241864 | 0.015611 |
| 4.2857 | 0.255499 | 0.017458 |
| 4.3929 | 0.269612 | 0.019481 |
| 4.5000 | 0.284219 | 0.021695 |

TABLE 5

| H | SAG | D |
|---|-----|---|
| 0.1071 | −0.00312 | 0.000000 |
| 0.2143 | −0.001246 | 0.000000 |
| 0.3214 | −0.002803 | 0.000001 |
| 0.4286 | −0.004982 | 0.000002 |
| 0.5357 | −0.007784 | 0.000006 |
| 0.6429 | −0.011206 | 0.000012 |
| 0.7500 | −0.015248 | 0.000023 |
| 0.8571 | −0.019909 | 0.000039 |
| 0.9643 | −0.025188 | 0.000062 |
| 1.0714 | −0.031083 | 0.000095 |
| 1.1786 | −0.037592 | 0.000140 |
| 1.2857 | −0.044713 | 0.000199 |
| 1.3929 | −0.052444 | 0.000277 |
| 1.5000 | −0.060783 | 0.000374 |
| 1.6071 | −0.0069727 | 0.000497 |
| 1.7143 | −0.079273 | 0.000648 |
| 1.8214 | −0.089416 | 0.000832 |
| 1.9286 | −0.100155 | 0.001053 |
| 2.0357 | −0.111484 | 0.001317 |
| 2.2500 | −0.135897 | 0.001996 |
| 2.1429 | −0.123400 | 0.001630 |
| 2.3571 | −0.148972 | 0.002422 |
| 2.4643 | −0.162618 | 0.002916 |
| 2.5714 | −0.176831 | 0.003483 |
| 2.6786 | −0.191604 | 0.004131 |
| 2.7857 | −0.206932 | 0.004868 |
| 2.8929 | −0.222808 | 0.005701 |
| 3.0000 | −0.239226 | 0.006640 |
| 3.1071 | −0.256179 | 0.007693 |
| 3.2143 | −0.273659 | 0.008868 |
| 3.3214 | −0.291658 | 0.010177 |
| 3.4286 | −0.310170 | 0.011628 |
| 3.5357 | −0.329186 | 0.013233 |
| 3.6429 | −0.348696 | 0.015002 |
| 3.7500 | −0.368691 | 0.016947 |
| 3.8571 | −0.389161 | 0.019081 |
| 3.9643 | −0.410096 | 0.021417 |
| 4.0714 | −0.431482 | 0.023970 |
| 4.1786 | −0.453307 | 0.026756 |
| 4.2857 | −0.475556 | 0.029793 |
| 4.3929 | −0.498212 | 0.033100 |
| 4.5000 | −0.521256 | 0.036700 |

TABLE 6

| H | SAG | D |
|---|-----|---|
| 0.1071 | 0.000164 | 0.000000 |
| 0.2143 | 0.000656 | 0.000000 |
| 0.3214 | 0.001475 | 0.000001 |
| 0.4286 | 0.002624 | 0.000002 |
| 0.5357 | 0.004102 | 0.000005 |
| 0.6429 | 0.005910 | 0.000011 |
| 0.7500 | 0.008050 | 0.000020 |
| 0.8571 | 0.010523 | 0.000034 |
| 0.9643 | 0.013330 | 0.000055 |
| 1.0714 | 0.016475 | 0.000085 |
| 1.1786 | 0.019959 | 0.000126 |
| 1.2857 | 0.023785 | 0.000181 |
| 1.3929 | 0.027957 | 0.000253 |
| 1.5000 | 0.032477 | 0.000346 |
| 1.6071 | 0.037351 | 0.000463 |
| 1.7143 | 0.042583 | 0.000609 |
| 1.8214 | 0.048178 | 0.000790 |
| 1.9286 | 0.054141 | 0.001010 |
| 2.0357 | 0.060480 | 0.001276 |
| 2.1429 | 0.067200 | 0.001594 |
| 2.2500 | 0.074310 | 0.001973 |
| 2.3571 | 0.081818 | 0.002419 |
| 2.4643 | 0.089733 | 0.002942 |
| 2.5714 | 0.098064 | 0.003552 |
| 2.6786 | 0.106823 | 0.004259 |
| 2.7857 | 0.116022 | 0.005075 |
| 2.8929 | 0.125672 | 0.006012 |
| 3.0000 | 0.135789 | 0.007085 |
| 3.1071 | 0.146388 | 0.008308 |
| 3.2143 | 0.157487 | 0.009699 |
| 3.3214 | 0.169104 | 0.011277 |
| 3.4286 | 0.181263 | 0.013064 |
| 3.5357 | 0.193987 | 0.015085 |
| 3.6429 | 0.207306 | 0.017366 |
| 3.7500 | 0.221251 | 0.019941 |
| 3.8571 | 0.235859 | 0.022846 |
| 3.9643 | 0.251174 | 0.026124 |
| 4.0714 | 0.267247 | 0.029825 |
| 4.1786 | 0.284135 | 0.034008 |
| 4.2857 | 0.301906 | 0.038738 |
| 4.3929 | 0.320642 | 0.044098 |
| 4.5000 | 0.340434 | 0.050179 |

TABLE 7

| H | SAG | D |
|---|-----|---|
| 0.1071 | −0.000353 | 0.000000 |
| 0.2143 | −0.001412 | 0.000000 |
| 0.3214 | −0.003177 | 0.000001 |
| 0.4286 | −0.005647 | 0.000003 |
| 0.5357 | −0.008821 | 0.000008 |
| 0.6429 | −0.012699 | 0.000018 |
| 0.7500 | −0.017278 | 0.000033 |
| 0.8571 | −0.022558 | 0.000056 |
| 0.9643 | −0.028535 | 0.000091 |
| 1.0714 | −0.035208 | 0.000140 |
| 1.1786 | −0.042574 | 0.000207 |
| 1.2857 | −0.050630 | 0.000296 |
| 1.3929 | −0.059371 | 0.000412 |
| 1.5000 | −0.068795 | 0.000560 |
| 1.6071 | −0.078895 | 0.000747 |
| 1.7143 | −0.089667 | 0.000978 |
| 1.8214 | −0.101105 | 0.001262 |
| 1.9286 | −0.113203 | 0.001606 |
| 2.0357 | −0.125953 | 0.002019 |
| 2.1429 | −0.139347 | 0.002510 |
| 2.2500 | −0.153379 | 0.003090 |
| 2.3571 | −0.168037 | 0.003770 |
| 2.4643 | −0.183312 | 0.004561 |
| 2.5714 | −0.199195 | 0.005477 |
| 2.6786 | −0.215672 | 0.006532 |
| 2.7857 | −0.232731 | 0.007741 |
| 2.8929 | −0.250358 | 0.009120 |

TABLE 7-continued

| H | SAG | D |
|---|---|---|
| 3.0000 | −0.268539 | 0.010686 |
| 3.1071 | −0.287257 | 0.012460 |
| 3.2143 | −0.306494 | 0.014461 |
| 3.3214 | −0.326229 | 0.016714 |
| 3.4286 | −0.346438 | 0.019245 |
| 3.5357 | −0.367098 | 0.022083 |
| 3.6429 | −0.388176 | 0.025260 |
| 3.7500 | −0.409641 | 0.028815 |
| 3.8571 | −0.431452 | 0.032790 |
| 3.9643 | −0.453563 | 0.037235 |
| 4.0714 | −0.475921 | 0.042208 |
| 4.1786 | −0.498462 | 0.047775 |
| 4.2857 | −0.521113 | 0.054015 |
| 4.3929 | −0.543787 | 0.061019 |
| 4.5000 | −0.566379 | 0.068896 |

Figure 16:
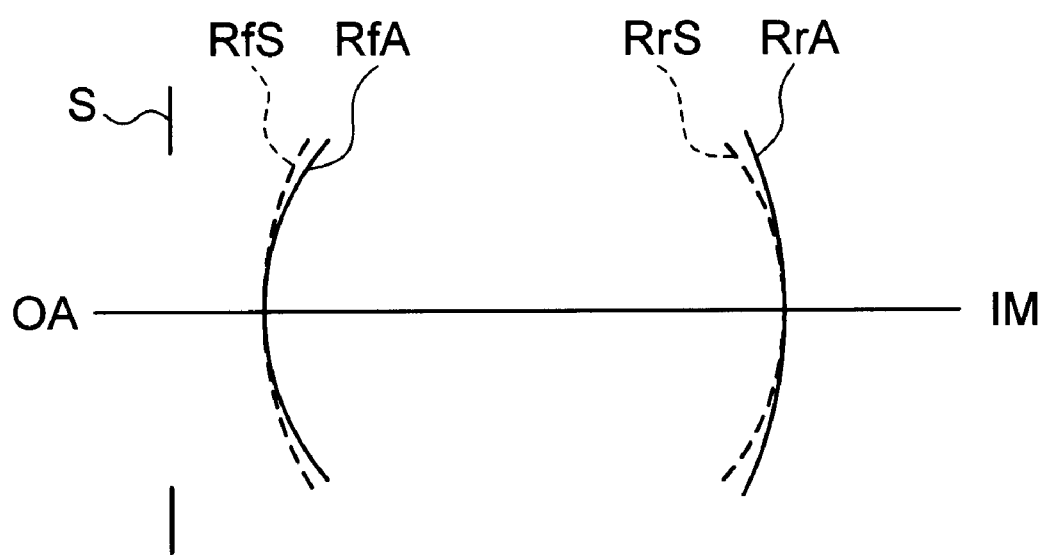
FIG. 16 shows a rough outline of the double aspherical lens adjacent to the aperture diaphragm S.

FIG. 16 shows a rough outline of the double aspherical lens adjacent to the aperture diaphragm S. In FIG. 16, OA denotes optical axis, IM denotes image side, broken lines RfS, RrS denote standard spherical surfaces to the Rf (near to the aperture diaphragm) and Rr (away from the aperture diaphragm) side, respectively. Solid lines RfA, RrA denote aspherical surfaces to the Rf and Rr side, respectively.

Figure 17:
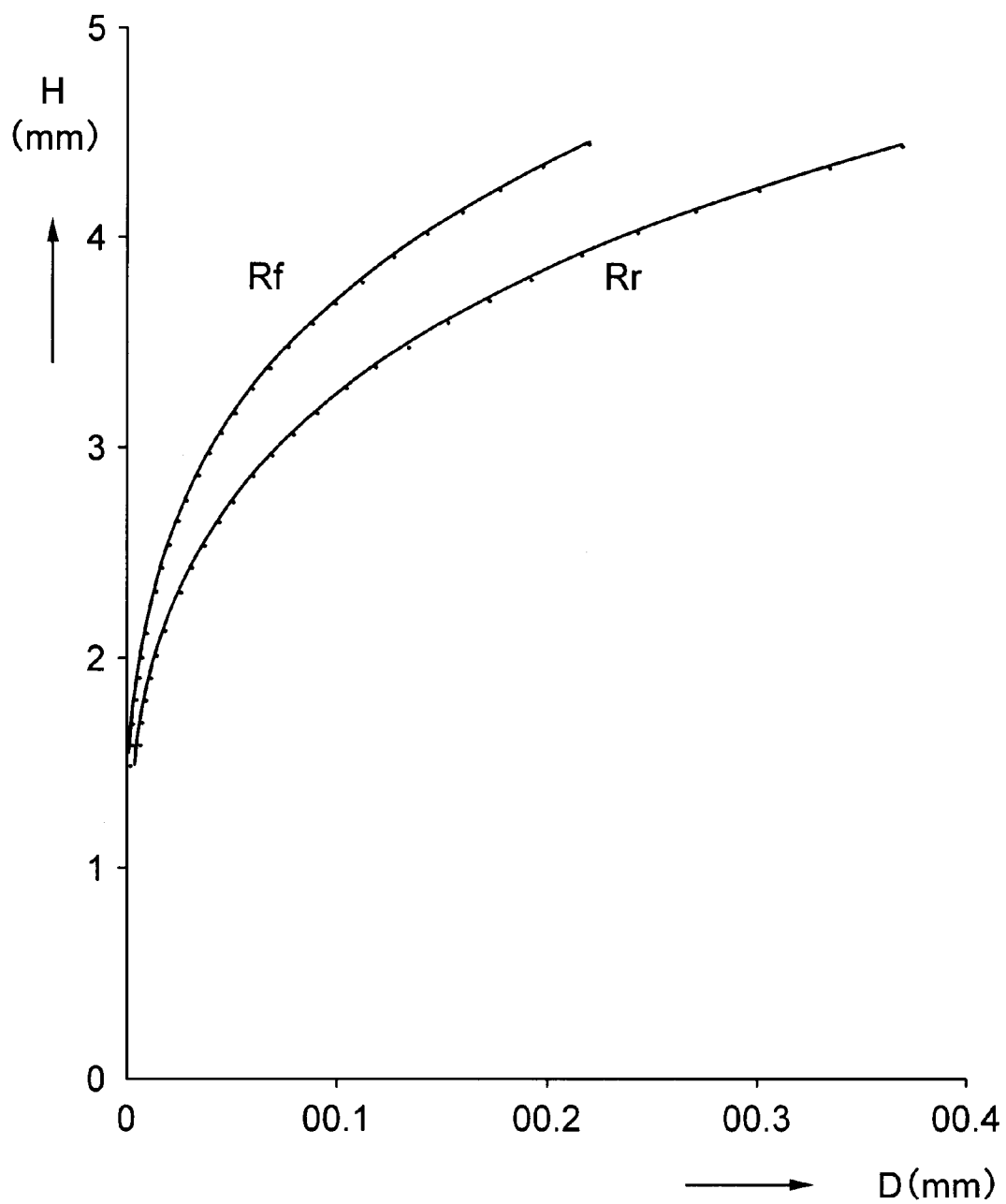
FIG. 17 shows each surface shape of the double aspherical lens adjacent to the aperture diaphragm according to the Numerical Example 1 as a difference from standard (base) spherical surface.

FIG. 17 shows the relation between the values H and D of the Rf and Rr surfaces as shown in Tables 4 and 5 according to the Numerical Example 1. As shown in FIG. 17, in the peripheral region, the refractive power of Rf surface varies greater than that of Rr surface. In other words, in the peripheral region where H has large value, amount of D becomes bigger in the Rr surface than in the Rf surface.

As described above, in the present invention, it is possible to provide a variable focal length optical system having high zoom ratio and compactness with small number of lens element. Although small diameter of lens and short total lens length in the telephoto end state are simultaneously achieved by arranging aspherical surfaces properly, it is needless to say that further high zoom ratio, large relative aperture, and compactness of the optical system can be achieved by using more number of aspherical surfaces.

What is claimed is:

1. A variable focal length optical system comprising at least three lens groups in order from an object side:

a first lens group having a positive refractive power;

a second lens group having a positive refractive power; and a third lens group having a negative refractive power;

wherein each lens group moves to the object side such that an air gap between said first lens group and said second lens group increases, and an air gap between said second lens group and said third lens group decreases when a state of lens group position is changed from a wide-angle end state to a telephoto end state;

wherein an aperture diaphragm is arranged between said first lens group and said third lens group, said second lens group comprises a positive lens having double aspherical surfaces arranged adjacent to said aperture diaphragm, and the following conditional formulae are satisfied;

$$Da/f<0.08 \tag{1}$$

$$0.3<(Ra+Rb)/(Ra-Rb)<0.95 \tag{2}$$

where Da denotes an air gap along an optical axis between said aperture diaphragm and said positive lens, f denotes a focal length of said variable focal length optical system, Ra denotes a radius of curvature of a surface of said positive lens facing to a space where said aperture diaphragm exists, and Rb denotes a radius of curvature of a surface of said positive lens facing opposite to said space where said aperture diaphragm exists, where Rb<0.

2. A variable focal length optical system according to claim 1, wherein said conditional formula (1) is always satisfied when the state of lens group position is changed from the wide-angle end state to the telephoto end state.

3. A variable focal length optical system according to claim 2, further satisfying the following conditional formula (3);

$$0.03<Db/fw<0.10 \tag{3}$$

where Db denotes a thickness of said positive lens along the optical axis, and fw denotes a focal length of said variable focal length optical system in the wide-angle end state.

4. A variable focal length optical system according to claim 3, further satisfying the following conditional formula (4);

$$0.4<f2/(fw \cdot ft)^{1/2}<0.7 \tag{4}$$

where f2 denotes a focal length of said second lens group, and ft denotes a focal length of said variable focal length optical system in the telephoto end state.

5. A variable focal length optical system according to claim 4, wherein said second lens group further comprises a negative sub lens group and a positive sub lens group, said aperture diaphragm is arranged between said negative sub lens group and said positive sub lens group, said positive lens is arranged in said positive sub lens group, and said negative sub lens group comprises a negative lens arranged most object side of said negative sub lens group having a concave surface facing to the object side.

6. A variable focal length optical system according to claim 3, further comprising;

a first auxiliary lens group having a negative refractive power arranged between said first lens group and said second lens group;

a second auxiliary lens group having a positive refractive power arranged between said second lens group and said third lens group;

wherein each lens group moves to the object side such that an air gap between said first lens group and said first auxiliary lens group increases, an air gap between said first auxiliary lens group and said second lens group decreases, an air gap between said second lens group and said second auxiliary lens group increases, and an air gap between said second auxiliary lens group and said third lens group decreases when a state of lens group position is changed from the wide-angle end state to the telephoto end state; and wherein said aperture diaphragm is arranged between said first auxiliary lens group and said second lens group.

7. A variable focal length optical system according to claim 6, wherein said first auxiliary lens group and said second auxiliary lens group move integrally when the state of lens group position is changed from the wide-angle end state to the telephoto end state.

8. A variable focal length optical system according to claim 7, wherein only said second lens group moves to an image side while focusing on an object at a short-distance; and the following conditional formula (5) is satisfied;

$$1/\{(1/\beta T)-\beta 2T\}^2 < 0.3 \qquad (5)$$

where βT denotes a lateral magnification of said variable focal length optical system in the telephoto end state, and β2T denotes a lateral magnification of said second lens group in the telephoto end state.

9. A variable focal length optical system according to claim 8, further satisfying the following conditional formula (6);

$$1.4 < (\beta 2W/\beta 2T)/Z < 3.0 \qquad (6)$$

where β2W denotes a lateral magnification of said second lens group in the wide-angle end state, and Z denotes a zoom ratio in which ft is divided by fw.

10. A variable focal length optical system comprising at least three lens groups, in order from an object side:
   a first lens group having a positive refractive power;
   a second lens group having a positive refractive power; and
   a third lens group having a negative refractive power;
   wherein each lens group moves to the object side such that an air gap between said first lens group and said second lens group increases, and an air gap between said second lens group and said third lens group decreases when the state of lens group position is changed from the wide-angle end state to the telephoto end state; and
   wherein an aperture diaphragm is arranged between said first lens group and said third lens group, said second lens group comprises a positive lens having double aspherical surfaces arranged adjacent to the image side of said aperture diaphragm.

11. A variable focal length optical system according to claim 10,
   wherein a surface of said positive lens facing to the space where said aperture diaphragm exists does not have point of inflection, and the refractive power changes gradually from a center to a periphery of said lens; and
   a surface of said positive lens facing opposite to said space where said aperture diaphragm exists is constructed such that refractive power changes more in a peripheral region than in a region where on-axis rays pass through.

12. A variable focal length optical system comprising at least three lens groups in order from an object side:
   a first lens group having a positive refractive power;
   a second lens group having a positive refractive power; and
   a third lens group having a negative refractive power;
   wherein each lens group moves to the object side such that an air gap between said first lens group and said second lens group increases, and an air gap between said second lens group and said third lens group decreases when a state of lens group position is changed from a wide-angle end state to a telephoto end state;
   wherein an aperture diaphragm is arranged between said first lens group and said third lens group, said second lens group comprises a positive lens having double aspherical surfaces arranged adjacent to said aperture diaphragm, and the following conditional formulae are satisfied;

$$Da/f < 0.08 \qquad (1)$$

$$0.3 < (Ra+Rb)/(Ra-Rb) < 0.95 \qquad (2)$$

where Da denotes an air gap along an optical axis between said aperture diaphragm and said positive lens, f denotes a focal length of said variable focal length optical system, Ra denotes a radius of curvature of a surface of said positive lens facing to a space where said aperture diaphragm exists, and Rb denotes a radius of curvature of a surface of said positive lens facing opposite to said space where said aperture diaphragm exists.

* * * * *